United States Patent
Steinhagen et al.

(10) Patent No.: US 11,612,831 B2
(45) Date of Patent: Mar. 28, 2023

(54) DEVICE AND METHOD FOR THE HIGH-PRESSURE TREATMENT OF BULK MATERIAL BY EXTRACTION AND/OR IMPREGNATION AND USE

(71) Applicants: UHDE HIGH PRESSURE TECHNOLOGIES GMBH, Hagen (DE); thyssenkrupp AG, Essen (DE)

(72) Inventors: Volkmar Steinhagen, Hagen (DE); Ansgar Herber, Dortmund (DE)

(73) Assignees: UHDE HIGH PRESSURE TECHNOLOGIES GMBH, Hagen (DE); THYSSENKRUPP AG, Essen (DE)

( * ) Notice: Subject to any disclaimer, the term of this patent is extended or adjusted under 35 U.S.C. 154(b) by 262 days.

(21) Appl. No.: 16/956,857

(22) PCT Filed: Dec. 21, 2018

(86) PCT No.: PCT/EP2018/086714
§ 371 (c)(1),
(2) Date: Jun. 22, 2020

(87) PCT Pub. No.: WO2019/122387
PCT Pub. Date: Jun. 27, 2019

(65) Prior Publication Data
US 2020/0324223 A1 Oct. 15, 2020

(30) Foreign Application Priority Data
Dec. 22, 2017 (DE) ...................... 10 2017 223 712.0

(51) Int. Cl.
*B01D 11/02* (2006.01)
*B01J 13/00* (2006.01)
(Continued)

(52) U.S. Cl.
CPC ...... *B01D 11/0246* (2013.01); *B01D 11/0203* (2013.01); *B01D 11/0207* (2013.01);
(Continued)

(58) Field of Classification Search
CPC ............ B01D 11/0246; B01D 11/0203; B01D 11/0207; B01D 11/0219; B01D 11/0226;
(Continued)

(56) References Cited

U.S. PATENT DOCUMENTS 2,292,716 A 8/1942 Pyzel
2,539,732 A * 1/1951 Donohue ........... D21C 11/0064
423/183
(Continued)

FOREIGN PATENT DOCUMENTS

CN 1671905 A 9/2005
CN 1827201 A 9/2006
(Continued)

OTHER PUBLICATIONS

English Translation of International Search Report issued in PCT/EP2018/086714, dated Apr. 25, 2019.

*Primary Examiner* — Joseph W Drodge
(74) *Attorney, Agent, or Firm* — thyssenkrupp North America, LLC

(57) ABSTRACT

Devices and methods for the high-pressure treatment of bulk material by extraction and/or impregnation. The bulk material is arranged in the interior volume of a pressure vessel device and is treated at a high pressure while sealed off from the surroundings. The high-pressure treatment is performed batchwise in a closed system in the pressure vessel device in a pressure-tight fashion. The bulk material is fed batchwise to the interior volume with the pressure vessel device closed and being arranged on at least one treatment level and, after the high-pressure treatment has occurred, being discharged (Continued)

batchwise from the interior volume with the pressure vessel device closed. The invention furthermore relates to the use of a supporting tray module with at least one treatment level for the high-pressure treatment in a closed system.

18 Claims, 12 Drawing Sheets

(51) Int. Cl.
    *B01J 8/10*     (2006.01)
    *B01J 19/20*     (2006.01)
    *B01J 3/00*     (2006.01)
    *C08J 11/08*     (2006.01)
    *A23F 5/24*     (2006.01)
    *C12C 3/10*     (2006.01)

(52) U.S. Cl.
    CPC ...... *B01D 11/0219* (2013.01); *B01D 11/0226* (2013.01); *B01D 11/0234* (2013.01); *B01D 11/0238* (2013.01); *B01D 11/0253* (2013.01); *B01D 11/0284* (2013.01); *B01D 11/0288* (2013.01); *B01J 3/008* (2013.01); *B01J 8/10* (2013.01); *B01J 13/0091* (2013.01); *B01J 19/20* (2013.01); *C08J 11/08* (2013.01); *A23F 5/24* (2013.01); *C08J 2300/14* (2013.01); *C08J 2300/30* (2013.01); *C12C 3/10* (2013.01)

(58) Field of Classification Search
    CPC ............ B01D 11/0234; B01D 11/0238; B01D 11/0253; B01D 11/0284; B01D 11/0288; B01D 11/0257; B01D 11/0242; B01D 11/028; B01D 11/04; B01D 11/0403; B01D 11/0476; B01D 11/0484; B01D 11/0488; B01D 11/0492; B01J 3/008; B01J 8/10; B01J 13/0091; B01J 19/20; B01J 3/006; B01J 3/02; B01J 3/04; B01J 3/06; B01J 19/18; B01J 19/1812; B01J 2219/00162; B01J 2219/00164; B01J 2219/00166; B01J 2219/00477; B01J 2219/00601; B01J 2219/0068; B01J 2219/00686; B01J 2219/00761; B01J 2219/00891; B01J 2219/00905; B01J 2219/32203; B01J 2219/32206; B01J 2219/32213; B01J 2219/32231; B01J 2219/32237; C08J 11/08; C08J 2300/14; C08J 2300/30; A23F 5/24; C12C 3/10
    See application file for complete search history.

(56) References Cited

U.S. PATENT DOCUMENTS

| | | | | |
|---|---|---|---|---|
| 2,664,967 A | | 1/1954 | Molstedt | |
| 2,729,550 A | * | 1/1956 | Maycock | B01D 11/043 210/511 |
| 2,893,945 A | * | 7/1959 | Berg | B01J 8/12 422/216 |
| 3,131,202 A | * | 4/1964 | Depmer | B01D 11/0238 422/272 |
| 3,894,128 A | * | 7/1975 | Hirao | B01D 3/163 137/512.1 |
| 4,258,011 A | * | 3/1981 | Prazmowski | B01D 11/0284 422/273 |
| 4,601,906 A | | 7/1986 | Shindler | |
| 4,778,588 A | * | 10/1988 | Brandes | C10G 45/04 502/151 |
| 5,290,950 A | * | 3/1994 | Raban | C07C 323/20 560/60 |
| 5,290,959 A | | 3/1994 | Rice | |
| 5,382,414 A | * | 1/1995 | Lautenschlager | B01D 11/0219 422/186 |
| 5,456,385 A | * | 10/1995 | Poussin | B01J 8/0453 422/216 |
| 5,688,473 A | * | 11/1997 | Lawrence | B01J 8/003 422/219 |
| 6,048,494 A | * | 4/2000 | Annapragada | B01J 3/03 220/240 |
| 6,569,313 B1 | * | 5/2003 | Carroll | C10G 65/12 208/143 |
| 7,897,050 B2 | | 3/2011 | Waibel | |
| 2008/0300386 A1 | * | 12/2008 | Lazarev | C07K 1/145 530/427 |
| 2011/0226608 A1 | * | 9/2011 | Lautenschlager | B01J 19/126 422/243 |
| 2016/0030860 A1 | * | 2/2016 | McGhee | C11B 1/108 422/116 |
| 2016/0114304 A1 | * | 4/2016 | Li | C01B 33/1585 34/406 |
| 2016/0270416 A1 | * | 9/2016 | Corey | C11B 1/108 422/116 |
| 2017/0246557 A1 | * | 8/2017 | Skell | B01D 3/163 137/512.1 |
| 2017/0291120 A1 | * | 10/2017 | Jackson | C10G 45/04 502/151 |
| 2018/0030372 A1 | * | 2/2018 | Maki | B01J 8/003 422/219 |
| 2018/0257048 A1 | * | 9/2018 | Webster | B01J 8/12 422/216 |

FOREIGN PATENT DOCUMENTS

| | | | | |
|---|---|---|---|---|
| CN | 104780988 A | | 7/2015 | |
| DE | 864 309 C | | 1/1953 | |
| DE | 865 505 C | | 2/1953 | |
| DE | 71 03 843 U | | 2/1971 | |
| DE | 3815726 A1 | * | 11/1989 | ............... B01J 8/12 |
| DE | 42 16 295 A | | 11/1993 | |
| DE | 199 46 146 A | | 4/2001 | |
| DE | 20119064 U1 | | 5/2002 | |
| DE | 20201949 U1 | | 5/2002 | |
| DE | 699 07 217 T2 | | 3/2004 | |
| DE | 102008039106 A1 | | 3/2010 | |
| DE | 202017007003 U1 | * | 5/2019 | ............ B01D 11/02 |
| EP | 0 222 207 A | | 5/1987 | |
| EP | 0 683 804 B | | 4/2001 | |
| EP | 1 681 387 A1 | | 7/2006 | |
| EP | 1701775 B1 | | 9/2006 | |
| EP | 1 725 706 B | | 5/2012 | |
| JP | 01293129 A | | 11/1989 | |
| JP | 2005-533937 A | | 11/2005 | |
| KR | 2010 0086297 A | | 7/2010 | |
| NL | 47526 C | | 1/1940 | |
| WO | WO9922837 | * | 5/1999 | ............... B01D 3/02 |
| WO | 2004105927 A1 | | 12/2004 | |
| WO | 10032260 A1 | | 3/2010 | |
| WO | 2017124106 A1 | | 7/2017 | |
| WO | 2019/122387 A | | 6/2019 | |

\* cited by examiner

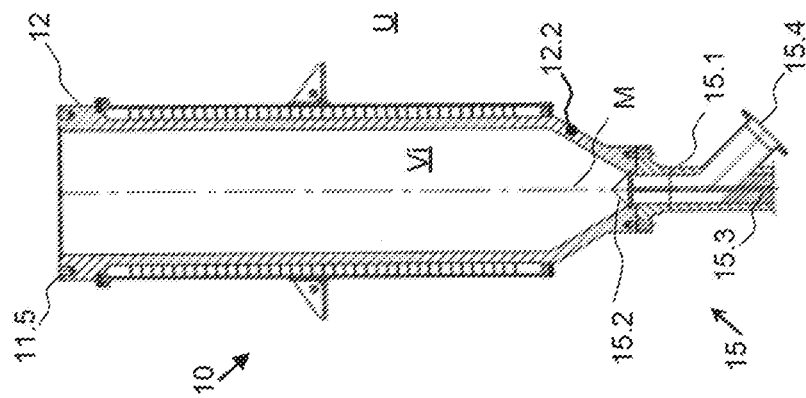
Fig. 2
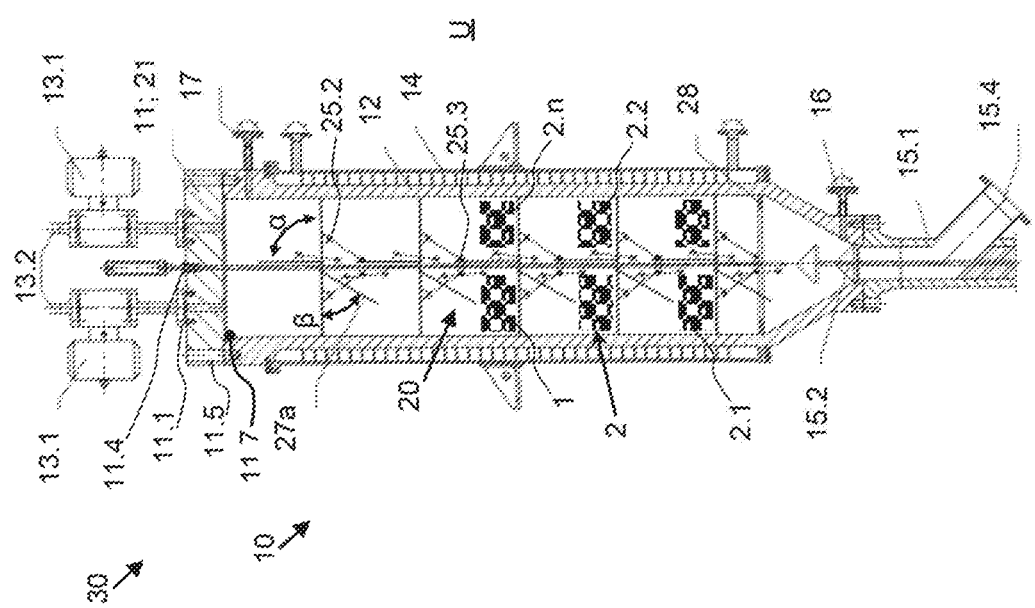
Fig. 1
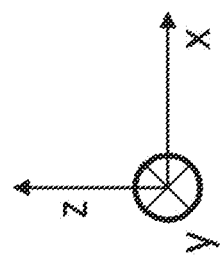

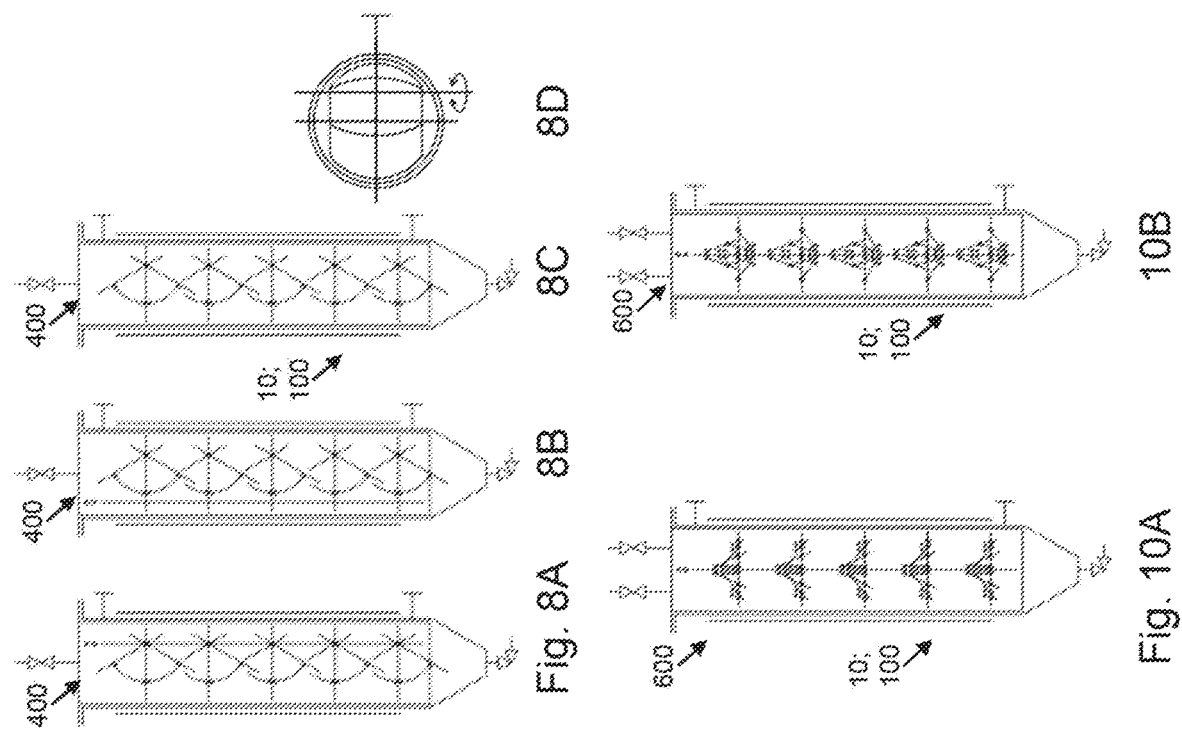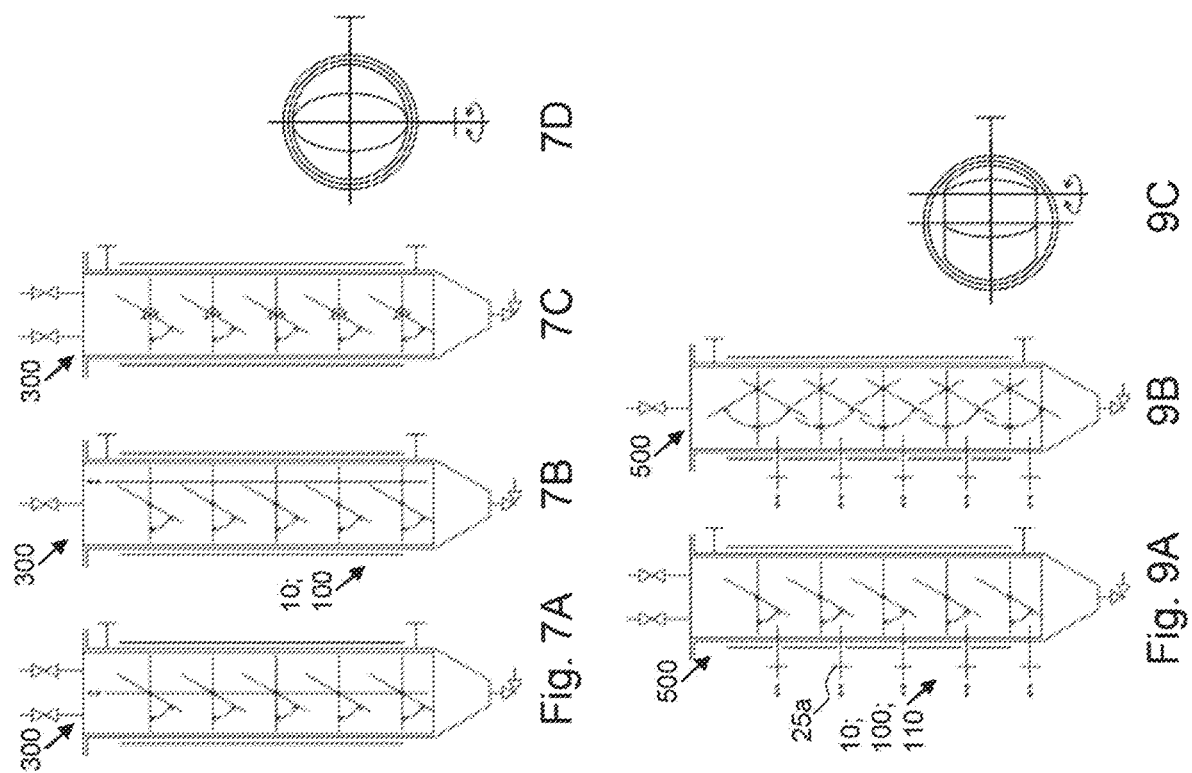

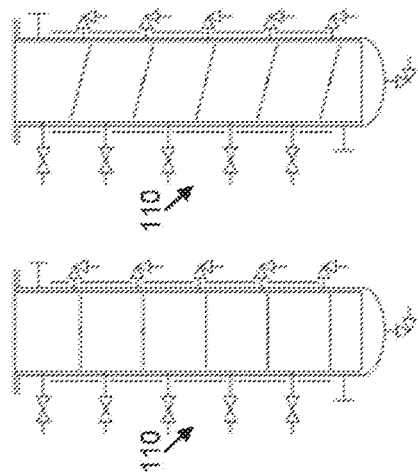
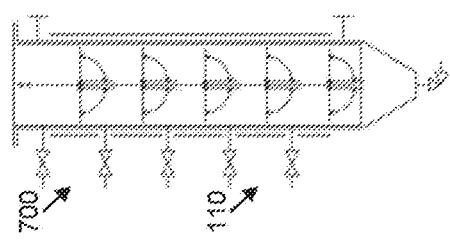
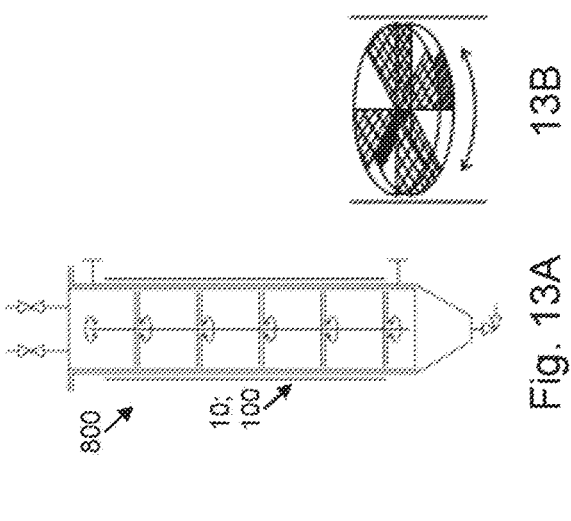
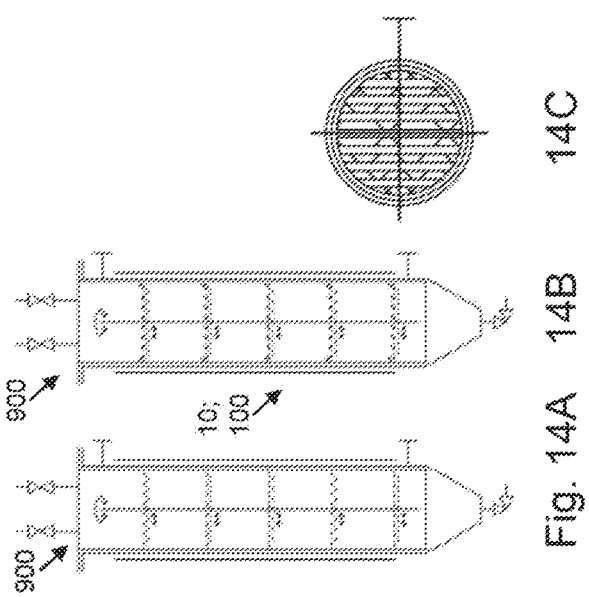
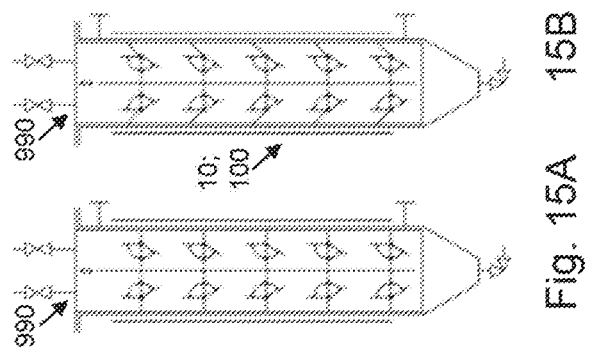
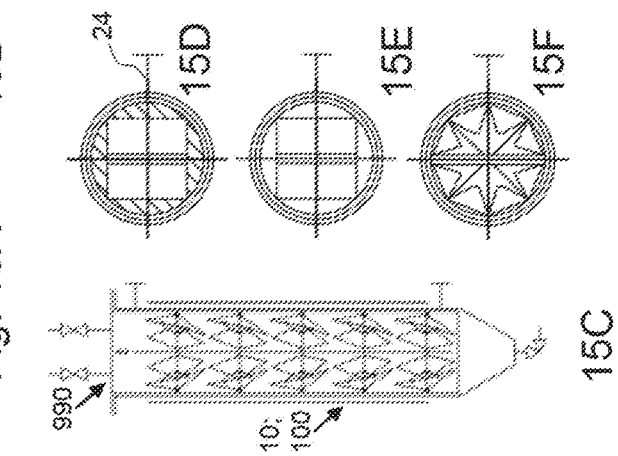
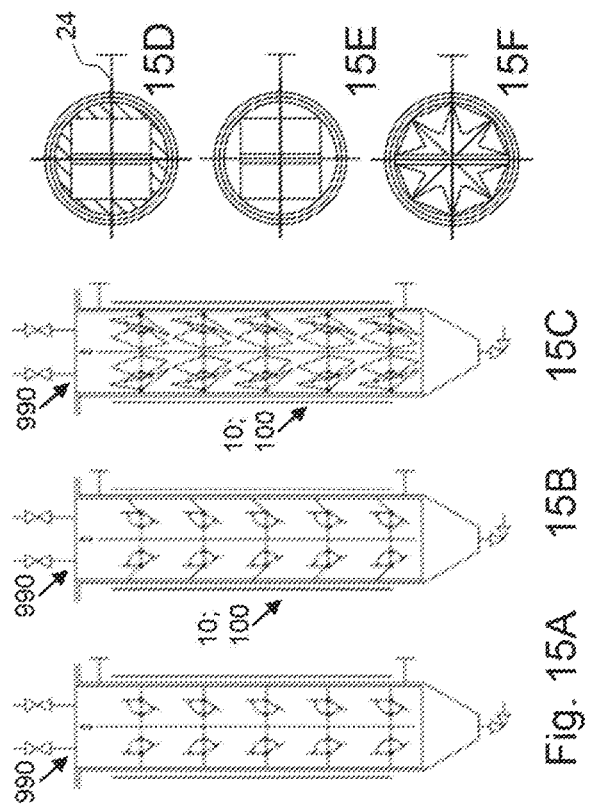

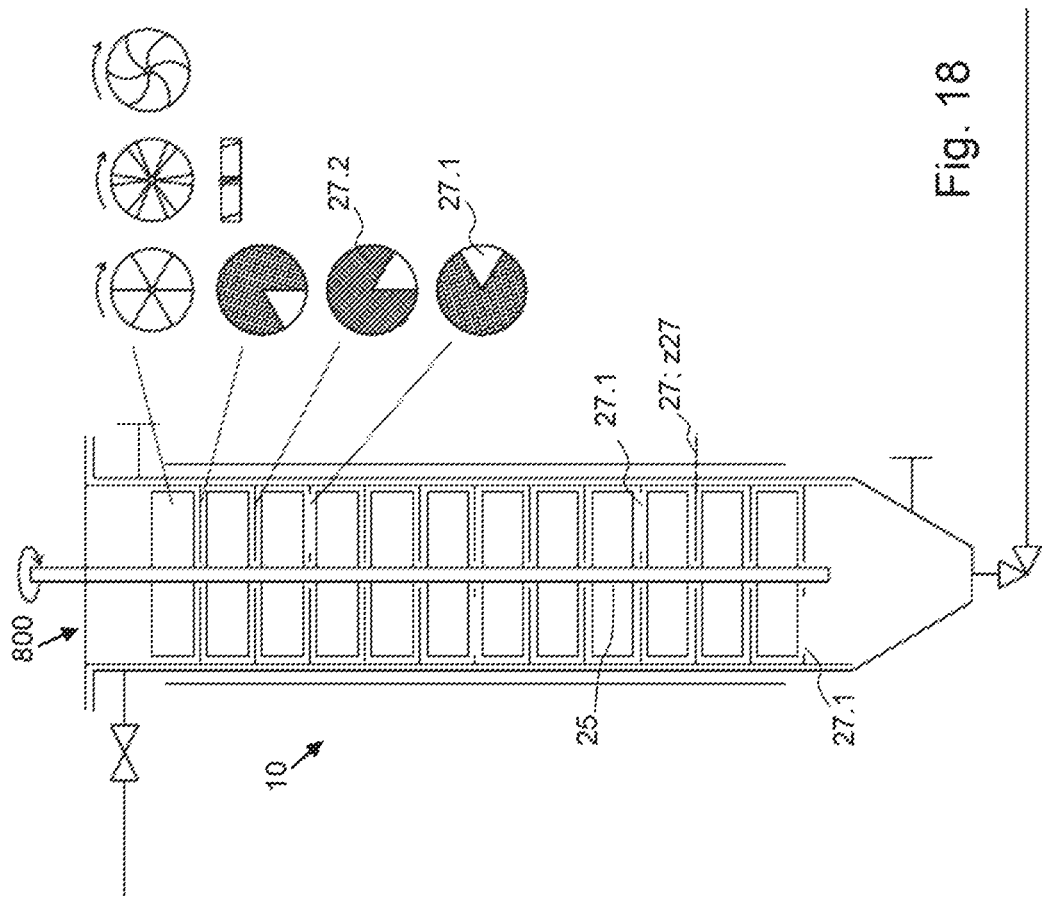

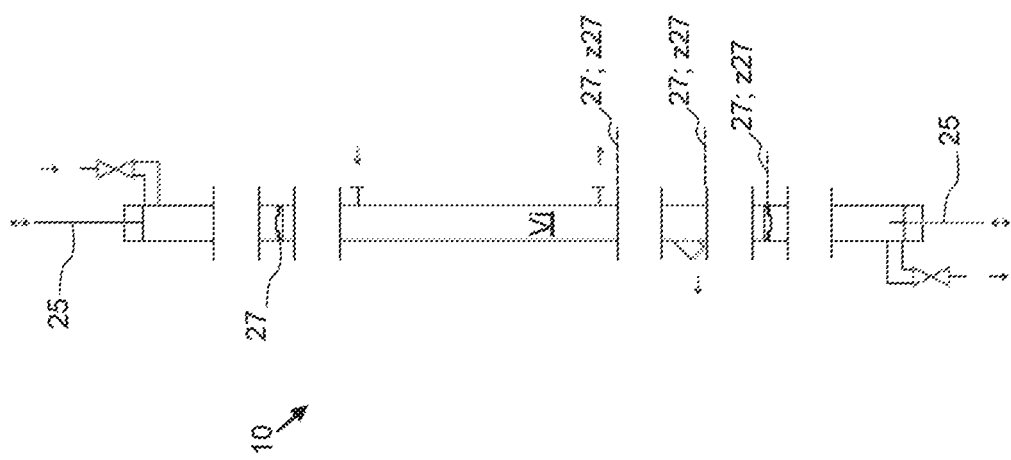

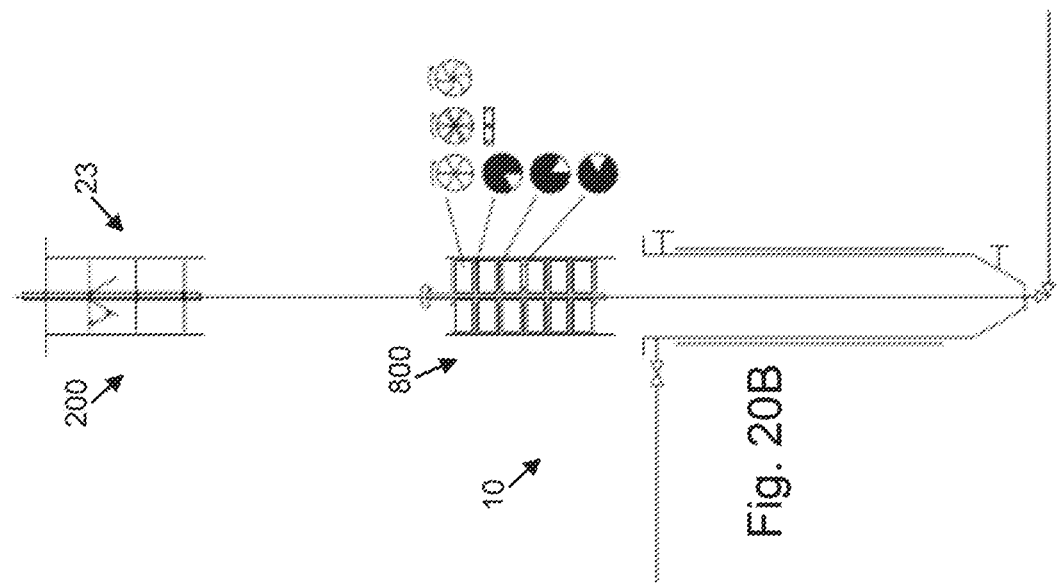
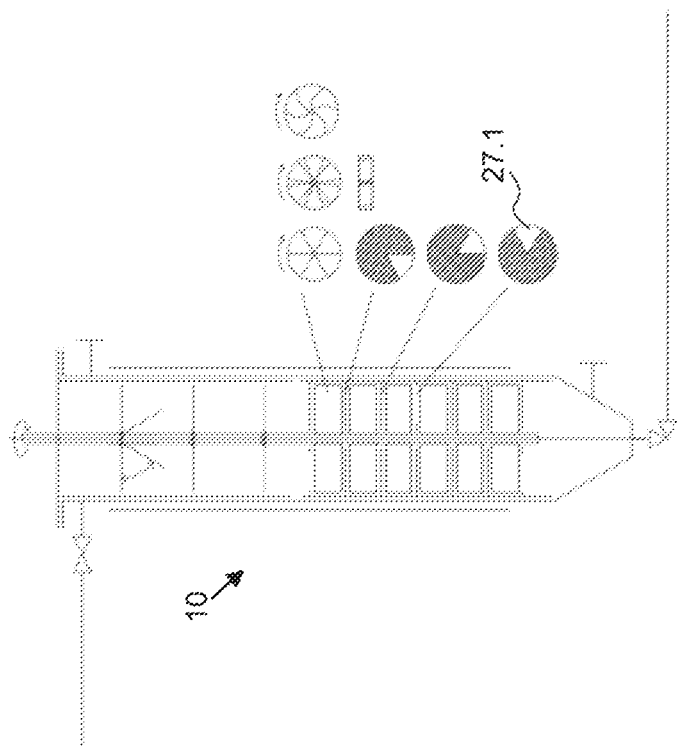
Fig. 20A
Fig. 20B

DEVICE AND METHOD FOR THE HIGH-PRESSURE TREATMENT OF BULK MATERIAL BY EXTRACTION AND/OR IMPREGNATION AND USE

CROSS REFERENCE TO RELATED APPLICATIONS

This application is a U.S. National Stage Entry of International Patent Application Serial Number PCT/EP2018/086714, filed Dec. 21, 2018, which claims priority to German Patent Application No. DE 10 2017 223 712.0, filed Dec. 22, 2017, the entire contents of both of which are incorporated herein by reference.

FIELD

The present disclosure generally relates to a device and a method for the high-pressure treatment of bulk material by extraction and/or impregnation.

BACKGROUND

Bulk materials, in particular in the form of granulates, must in many cases have substances, in particular solvents, removed from them. The bulk materials must in particular also generally be subjected to a pure extraction, irrespective of solvents. This may advantageously be performed at high pressure, in particular at pressures above 100 bar, in particular at elevated temperature in conjunction with the action of heat. An extraction, in particular extraction of solvent(s), occurs in many cases preferably using supercritical fluids (or extraction media), for example carbon dioxide ($CO_2$), propane, butane, in particular because, here, surface forces can be minimized and the extraction is made particularly effective, also with regard to a drying effect. Here, both fluids and solids can be extracted.

Prominent examples for extraction methods are for example the decaffeination of tea leaves, coffee beans or hop extraction. Since extraction is involved in the production of a wide variety of consumer products, the number of variants of extraction methods is also relatively high. This is also reflected in the construction and in the range of sizes of the installations. For example, it is not uncommon to implement an extraction column with a height of greater than 10 m, or to interconnect multiple extractors (pressure vessels) with one another to form an installation. At any rate, a wide range of variants exists in the existing installation concepts, also with regard to size variations.

For impregnation methods, whether performed separately or in combination with an extraction, numerous similar examples exist.

The extractive removal of solvents from bulk material or from granulates has hitherto in many cases occurred through the arrangement of the bulk material in an extractor (pressure vessel), in particular on a level in a layer with a predefined maximum layer height, which layer is impinged on and flowed through by extraction medium (in particular $CO_2$). For the arrangement of the bulk material, use is commonly made of a basket-like insert, also known as a product-accommodating basket, for example with a volume of approximately 250 liters and with a cylindrical casing wall, with a filter tray which is permeable to gas, of wire-mesh-like form, of perforated-plate-like form or manufactured from sintered metal and on which the insert is supported in the extractor. A cover of the basket may likewise be permeable to gas, of wire-mesh-like form, of perforated-plate-like form or manufactured from sintered metal. The basket-like insert can be inserted in the region of a cover of the extractor, and, after the extraction, the bulk material that has been substantially freed from solvent can be transported away for further use by removal of the basket-like insert. The next batch can thereupon be arranged in the extractor by means of the same or a further basket-like insert. In other words: The high-pressure treatment method is performed in batch wise fashion, wherein the basket-like insert is also intended to facilitate the handling of the respective batch, for example the transporting-away process.

In the case of the hitherto implemented method of extractive solvent removal, relatively high outlay in terms of personnel and expenditure of time is necessary. The handling of the basket-like insert cannot be automated in a simple manner. If hazardous materials or media or solvents which are harmful to health or combustible are involved, considerable expenditure is necessary with regard to working safety, in particular with regard to explosion protection, not least because personnel must commonly be involved.

Disadvantages of previous devices and methods are therefore in particular the explosive gas mixtures that form, and the adverse health effects for personnel involved. There is therefore an interest in simplifying high-pressure treatment methods for bulk materials, in particular with minimized outlay in terms of personnel, in particular for large amounts of bulk material, in particular for extraction and/or impregnation.

Thus a need exists for a device and a method where the high-pressure treatment can be simplified and the outlay in terms of device or method technology associated with the high-pressure treatment can be reduced. In particular, it is also the intention here to increase operating and/or working safety. Not least, there is also an interest in realizing a method which is as efficient as possible, specifically in the case of extraction, in particular solvent extraction, and/or in the case of impregnation, in each case at high pressure.

BRIEF DESCRIPTION OF THE FIGURES

FIG. 1 is a schematic sectional side view of a closed pressure vessel device and a high-pressure treatment system according to an exemplary embodiment.

FIG. 2 is a schematic sectional side view of an open pressure vessel device (without supporting tray module) and the supporting tray module according to an exemplary embodiment.

FIGS. 7A-7D are different schematic views of the further exemplary embodiments in each case.

FIGS. 8A-8D are different schematic views of the further exemplary embodiments in each case.

FIGS. 9A-9C are different schematic views of the further exemplary embodiments in each case.

FIGS. 10A-10B are different schematic views of the further exemplary embodiments in each case.

FIGS. 11A-11B are different schematic views of the further exemplary embodiments in each case.

FIG. 12 is a different schematic view of the further exemplary embodiment in each case.

FIGS. 13A-13B are different schematic views of the further exemplary embodiments in each case.

FIGS. 14A-14C are different schematic views of the further exemplary embodiments in each case.

FIGS. 15A-15F are different schematic views of the further exemplary embodiments in each case.

FIG. 18 is a schematic perspective sectional side view of one further exemplary embodiment of a pressure vessel device.

FIG. 19 is a schematic sectional side view of translational actuating members in a pressure vessel device according to exemplary embodiments.

FIG. 20A is an exploded schematic sectional side view of a further exemplary embodiment of a pressure vessel device with a combined supporting tray module for both translational and rotational actuating movements.

FIG. 20B is an exploded schematic sectional side view of a further exemplary embodiment of a pressure vessel device with a combined supporting tray module for both translational and rotational actuating movements.

DETAILED DESCRIPTION

Figure 4:
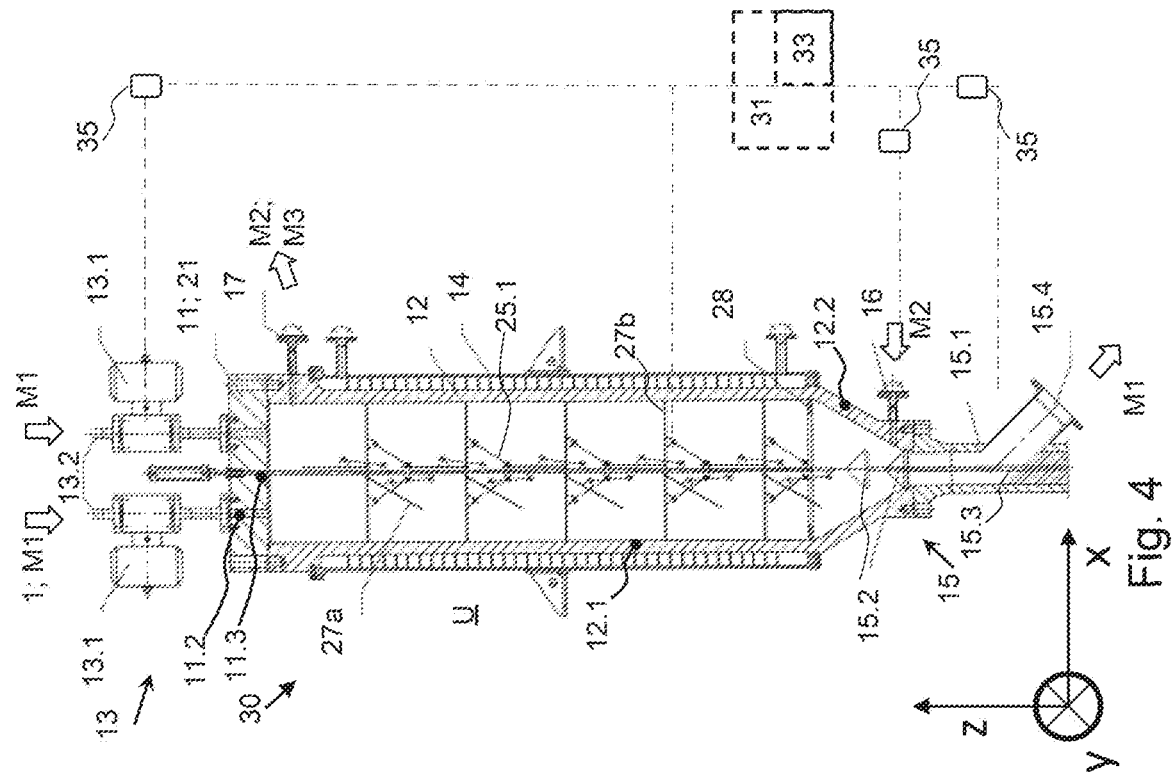
FIG. 4 is a schematic sectional side view of a closed pressure vessel device and a high-pressure treatment system according to an exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a device and a method for the high-pressure treatment of bulk material by extraction and/or impregnation. The invention furthermore relates to the use of a supporting tray module with at least one treatment level for the high-pressure treatment in a closed system. In particular, the invention relates to a device and a method in each case according to the preamble of the respective independent claim.

The solution to the problem described in the prior art is achieved by means of a pressure vessel device configured for the high-pressure treatment, at a high pressure level in the range from 40 to 1000 bar, of bulk material by extraction and/or impregnation, having a cover and having a high-pressure-resistant wall, which wall encloses an interior volume which in particular is sealed off or can be sealed off from the surroundings in pressure-tight fashion by means of a cover, and having an inlet fitting coupled to the interior volume and having an outlet fitting, in each case for the bulk material; wherein the pressure vessel device has a supporting tray module which is in particular, arranged in a suspended manner in the interior volume and which has a multiplicity of actuatably mounted and positioned treatment levels, which supporting tray module or which treatment levels are arranged/arrangeable one above the other in the interior volume, and loadable with bulk material in partial batches with the pressure vessel device closed, and, after the high-pressure treatment has occurred at the high pressure level, unloadable or actuatable in partial batches with the pressure vessel device closed, in such a way that the high-pressure treatment can be performed in a closed system which is sealed off with respect to the surroundings. According to the invention, the supporting tray module has at least one geometrically coupling intermediate element and multiple holding units for mechanical stability and support and, in the lower region, a support unit for radial support. This also makes possible a method with reduced outlay in terms of process technology, in particular also with regard to manual activities, and not least facilitates process automation.

The feed and extraction and/or impregnation (high-pressure treatment) in a closed system also has the advantage that less stringent requirements have to be satisfied with regard to explosion protection. Measures for operational safety can therefore remain relatively inexpensive. Also, a risk of high-pressure sealing not being implemented correctly can be greatly minimized. There is no need to open high-pressure closures.

Without an inserted supporting tray module, the interior volume preferably corresponds to an empty cavity, in particular with a cylindrical geometry, optionally conical at the outlet.

For example, 30 to 100 kg of bulk material or granulate, in particular approximately 55 kg, is accommodated on each treatment level.

The interior volume defined by the pressure vessel device amounts to, for example, 100 liters to 10 $m^3$ or even up to 20 $m^3$. In the treatment of foodstuffs, use is for example made of volumes in the range from 3 to 5 $m^3$, in particular in the case of a high pressure of approximately 300 to 600 bar. The volume of the bulk material accommodated in the interior volume amounts to, for example, 50 liters to 5 $m^3$ or even up to 10 $m^3$, if a bulk material which swells during extraction is involved. Bulk material which does not swell may in this case optionally also occupy a greater volume fraction of the interior volume, for example 0.7 to 0.8 times the interior volume.

The volumes mentioned here are to be understood as examples. The arrangement according to the invention and the method according to the invention may also be implemented for relatively small volumes, for example on a laboratory scale, for example with 5 to 25 liters, for example in the case of extraction autoclaves.

Here, granulate is to be understood to mean any bulk material, be it artificial or manufactured material or natural substances, such as inter alia foodstuffs, for example polymer beads, or coffee beans, or hops. The granulate need not necessarily be prefabricated for the method, but rather may also be a natural substance or a foodstuff which is provided directly for high-pressure treatment after being obtained (for example spices, herbs). The high-pressure treatment according to the invention may also be used, for example, for the cleaning of metal or plastics parts. The bulk material or granulate may be present in a wide range of hardnesses, for example may also be relatively soft. The bulk material may, irrespective of the degree of hardness, be a swelling (volume increase) or shrinking or compacting (volume decrease) bulk material. The granulate has for example a grain size in the range from 3 to 6 mm. The bulk material may be one which swells with a considerable change in volume, for example by a factor of 2 to 10 (in particular in relation to the diameter or the volume), for example from 5 mm to 10 mm particle diameter. Swelling bulk material may be dosed such that the respective treatment level still has a buffer volume even after the swelling; for example, before the high-pressure treatment, only approximately 50% of the loading capacity of the treatment level is loaded. An arrangement of the bulk material on multiple levels in this case also permits swelling behavior which is not influenced, or is negatively influenced, by gravitational force influences.

It has been found that the method according to the invention is advantageous not only for extraction treatments but also for impregnation treatments. Here, according to the invention, it is also possible for a combination of both treatment methods to occur, in particular optionally at at least approximately the same high pressure level in the closed system.

The respective treatment level does not need to be oriented strictly horizontally, nor does it need to be exactly planar. The respective treatment level serves for the arrangement of the bulk material, in particular with a predefined layer thickness. If the feed and/or discharge is to occur in a lateral direction, it may be advantageous for the treatment level to be inclined and/or configured with a bulge.

Here, a closed pressure vessel device or a closed system is to be understood to mean an arrangement in the case of which at least one cover of the pressure vessel device remains installed. A removal of admission baskets or similar accommodating containers from the pressure vessel device is not necessary; the pressure vessel device can remain closed.

In one exemplary embodiment, the pressure vessel device has an inlet fitting, which is actuatable in automated fashion, for the batchwise feed of the bulk material, which inlet fitting is in particular coupled to the cover. In one exemplary embodiment, the pressure vessel device has an outlet fitting, which is actuatable in automated fashion, for the batchwise discharge of the bulk material, which outlet fitting is in particular coupled to a tray of the pressure vessel device. In this way, it is possible in each case for automation to be facilitated, and optionally also for an interface or system boundary with respect to the high-pressure region to be formed. An automated actuation may in particular occur by means of a control device configured for the purpose.

In one exemplary embodiment, the at least one treatment level is configured for accommodating the bulk material in an in particular horizontally oriented plane, and is furthermore configured for the passage of bulk material. This also provides flexibility with regard to the manner of the loading/unloading of the pressure vessel device, in particular in the case of a process which is regulated in multiple partial batches.

According to the invention, the supporting tray module has a multiplicity of actuatable treatment levels which can each be loaded with/unloaded of bulk material in partial batches with the pressure vessel device closed. In this way, a variation with regard to the arrangement of bulk material, in particular with regard to a maximum layer thickness, can be implemented even in the closed system.

In one exemplary embodiment, at least one partial region of the respective treatment level is displaceable, in particular by means of a kinematic pivot mechanism, from a corresponding high-pressure treatment position into at least one loading/unloading position. This also has advantages with regard to material flow. In particular, the material flow can be organized in a gravitational-force-driven manner.

The displacement of the respective treatment level may be performed by means of a kinematic mechanism which is designed preferably as a kinematic pivot mechanism. Here, pivoting is to be understood to mean a rotation about an at least approximately horizontally oriented axis. The kinematic mechanism may optionally also comprise a rotational mechanism about an axis with an alternative orientation, and/or at least one translational mechanism. The kinematic mechanism may comprise a flap mechanism with rotary joints and thrust rods. The kinematic (pivot) mechanism may also encompass a translational displacement. The kinematic mechanism may be formed or supplemented by tensile means, for example in the form of chains or cables, and optionally also by spring elements. The kinematic (pivot) mechanism may also comprise rotary drives arranged in a respective pivot axis or axis of rotation. Rotary drives can provide the advantage that no high-pressure-tight leadthroughs in the wall are necessary. The rotary drives may be arranged at the inside in the interior volume.

In one exemplary embodiment, the respective treatment level is defined by at least one gas-permeable plate. This embodiment is also distinguished by simplicity and robustness.

In one exemplary embodiment, the respective treatment level is defined by at least one pivotably actuatable gas-permeable plate mounted on the interior volume, in particular by two plates which are mounted so as to be pivotable relative to one another about a pivot axis $(x, y)$, in particular at least downwardly pivotable, preferably both downwardly and upwardly pivotable. In this way, a robust kinematic mechanism can be provided by means of which both the loading and the emptying can be performed in a simple manner. The plates may in particular, for the loading process, be pivoted upward, in each case so as to expose a treatment level arranged further therebelow. The plates may in particular, for the unloading process, be pivoted downward, in particular in succession, in each case so as to open up only one treatment level. Here, the downward pivoting may also provide an advantage with regard to protection of individual components of the kinematic mechanism, in particular components which are arranged below the respective treatment level.

In one exemplary embodiment, the respective treatment level is defined by two gas-permeable plates which are mounted on a transverse web so as to be in each case downwardly and upwardly pivotable relative to one another about a pivot axis, in particular with the transverse web held on at least two holding units which run in a height direction, in particular by a first pivot angle upward of at least 60° or 75°, preferably at least 85° or approximately 90°, and by a second pivot angle downward of at least 45° or 60°. This provides large variation possibilities during the loading/unloading processes. In particular, the relatively large upward pivot angle can provide advantages during the loading of treatment levels arranged further below, and a relatively small upward pivot angle can also permit a directed material flow, for example radially outward, away from centrally arranged kinematic mechanism components. An upward pivot angle of approximately 90° also promotes homogeneous filling of the levels. Pivoting beyond 90° may likewise be implemented.

In one exemplary embodiment, the supporting tray module has a kinematic mechanism with a construction which, in a respective treatment level, is symmetrical with respect to at least one pivot axis. This also yields advantages with regard to material flow. In particular, the respective treatment level can be loaded in a homogeneous manner even in the case of a relatively large vessel diameter. For example, a respective plane of symmetry is coupled to a respective inlet line.

In one exemplary embodiment, the respective treatment level is actuatable between at least two positions, specifically a first position for the passage of bulk material and a second position for the accommodation (or arrangement) and treatment of bulk material, in particular by means of a drive unit integrated into the cover or fastened to the cover and by means of at least one actuatable actuating member. This results in a relatively simple form of open-loop/closed-loop control of operating states. It is optionally also possible for intermediate positions to be provided.

The actuation can occur from the outside, that is to say from outside the interior volume. This provides degrees of freedom in the selection and configuration of the respective drive unit, in particular independently of the high pressure level prevailing in the interior volume. It is optionally possible for one or more drive units to also be arranged in the interior volume.

The respective actuating member may be in the form of a tension/thrust rod or in the form of a pure tension means (cable, chain), optionally coupled to a spring element (in particular with regard to a resetting movement).

An actuation and/or bulk material feed via the cover can provide multiple advantages: it is not necessary to define height positions or height levels at predefined height positions; the high-pressure vessel can be of structurally simpler and/or more pressure-resistant design; cost advantages; optionally central drive unit for multiple actuating members.

In one exemplary embodiment, the pressure vessel device has at least one drive unit and a multiplicity of actuating members in the form of thrust/tension rods configured for bidirectional translational actuation of the respective treatment level, in particular with the actuating members in a linear arrangement adjacent to one another in a transverse plane (xz, yz). In this way, it is possible to realize a compact kinematic mechanism without a large space requirement in the interior volume, and without significant side effects with regard to material flow. Thrust/tension rods can provide robustness and operational reliability even in the case of actuating movements in multiple directions.

In one exemplary embodiment, the respective treatment level or a plate of the treatment level is coupled by means of at least one actuating lever and two rotary joints to an actuatable actuating member guided in high-pressure-tight fashion through the cover into the interior volume, in particular is actuatable from the outside. In this way, it is possible to provide a robust kinematic (pivot) mechanism which is of simple construction. Here, the coupling may be provided preferably below the treatment level.

In one exemplary embodiment, the pressure vessel device comprises a pneumatic, hydraulic, electrical, electromagnetic and/or magnetic drive unit which is coupled to the at least one treatment level. In this way, automation is simplified, wherein the type of drive can in particular be selected in a manner dependent on the bulk material for treatment.

In one exemplary embodiment, the pressure vessel device comprises a drive unit which is coupled to the at least one treatment level and which is arrangeable/arranged at the outside on the cover or at the inside in the interior volume. In this way, it is possible for actuating movements to be automated individually for each treatment level. In the case of an arrangement at the outside, the drive unit may be coupled by means of at least one actuating member to the respective treatment level. A high-pressure seal, in particular in the form of a compression gland with packing, provided in the cover can in this case form a high-pressure-tight passage for the actuating member. Here, use may be made of rod and shaft seal technology.

It is preferable for a respective actuating lever to be arranged below the respective treatment level. In particular, the respective actuating lever is coupled by means of a first rotary joint to the actuating member and by means of a second rotary joint to an underside of a plate of the treatment level. In this way, it is possible by means of a translational actuating movement of the actuating member to induce a pivoting movement between at least two pivoting positions of the plate, in particular both upward and downward (absolute pivot angle about a pivot axis for example in the range from 135° to 175° or even up to) 180°. Owing to the arrangement below the respective treatment level, it is also possible for a jamming or wedging of bulk material against the actuating levers to be prevented in an effective manner. The vessel can be loaded from above and unloaded in a downward direction, wherein the respective plate/treatment level in each case covers the actuating members and protects these against contact with bulk material.

Preferably, in a respective treatment level, two semicircular plate elements are in each case jointly coupled to an actuating member, in particular in each case to an actuating lever mounted in a rotationally articulated manner at both sides.

In one exemplary embodiment, the pressure vessel device has in each case at least one inflow and/or outflow fitting, in particular a connector for high-pressure or extraction medium, in particular in a radial or lateral orientation. In this way, it is possible to realize a simple construction, in particular with regard to a fixed bed through which flow passes axially. Inflow and outflow fittings may be provided as radial connectors at the top and at the bottom on the vessel, for an axial flow through the interior volume in an upward and/or downward direction.

The respective connector may be led through the vessel wall, optionally also through the cover. The connectors may also be arranged oppositely at a similar height position, in each case in relation to a treatment level.

In one exemplary embodiment, the pressure vessel device has a heating device which heats the interior volume, in particular in an embodiment as a fully circumferential heating jacket, which extends in a height direction over the treatment level(s). This permits temperature control of the interior volume.

Here, solvents may also be exported from the pressure vessel via the outflow fitting. Optionally, a further outlet or connector is provided specifically for solvent, in particular at a separation or convection point of the pressure vessel. Multiple inflow/outflow fittings for fluids may be advantageous with regard to an even more homogeneous flow through the bed.

For the introduction and discharge of the bulk material, it may be advantageous for further connectors to be provided, in particular for each level. This permits a material flow for example even if a build-up or a blockage occurs in the gravitational force direction. According to the invention, it however suffices to provide only one single inlet fitting and one single outlet fitting for the bulk material, which also provides advantages with regard to outlay in terms of construction. The inlet and outlet fitting may preferably be arranged one above the other in the gravitational force direction, with at least the outlet fitting in preferably central arrangement.

In one exemplary embodiment, the supporting tray module is integrated into the cover or is held, arranged and/or supported in the interior volume at least by means of the cover. In this way, it is also possible to realize a simple construction. In other words: The high-pressure-resistant cover is configured for accommodating tensile forces which are exerted by the batch and the module. Installation of the module in a suspended manner in the interior volume Vi facilitates not least the assembly process, or simplifies scaling, and can also promote the material flow, in particular because no supporting fixtures on a base impede the material flow. In this context, the arrangement of drives externally outside the interior volume, in particular on the cover, is also advantageous.

In one exemplary embodiment, the cover of the pressure vessel device forms a/the cover of the supporting tray module. In one exemplary embodiment, the inlet fitting for bulk material is integrated into the cover, in particular in an arrangement with a vertical conveying direction. In this way, the outlay in terms of apparatus can be further minimized in each case.

In one exemplary embodiment, the interior volume is of cylindrical or at least rotationally symmetrical form. This shape may be particularly preferred already owing to the use for high pressure. This however also yields advantages with regard to material flow and flow profile. The wall may be correspondingly cylindrical, aside from a preferably conical base portion. Preferably, the wall is cylindrical, with at least approximately the same diameter, along the treatment levels, and also terminates in an upward direction toward the cover with the same constant diameter. This also has advantages with regard to material flow.

In one exemplary embodiment, at least three treatment levels are provided, preferably at least four or five treatment levels. In this way, the high-pressure treatment can be performed more effectively and/or more efficiently. In particular, it is also possible to avoid flow-related disadvantages of fixed beds with a relatively long flow path.

In one exemplary embodiment, the pressure vessel device is configured for carrying out a method as described above. This results in the abovementioned advantages.

In one exemplary embodiment, the respective treatment level is displaceable by means of at least one rotationally actuatable actuating member, for example by means of a shaft with plates coupled rotationally conjointly thereto. This also expands the variability, and permits combinations in the configuration of the type of kinematic mechanism for the material flow. In particular, it is possible for partial aspects with regard to material flow to be optimized.

In one exemplary embodiment, the respective treatment level is displaceable, be it pivotable or displaceable in a translational direction, by means of at least one translationally actuatable actuating member. This also makes it possible, for example, to vary the position of treatment levels.

In one exemplary embodiment, the supporting tray module comprises both at least one translationally actuatable actuating member and at least one rotationally actuatable actuating member. This permits a functional integration into a combined supporting tray module with at least two different kinematic mechanisms.

The above-stated object is also achieved according to the invention by means of a high-pressure treatment system, in particular solvent extraction system, having a pressure vessel device with an above-described supporting tray module, in particular furthermore comprising a control device and at least one sensor unit. This results in the abovementioned advantages.

The above-stated object is also achieved according to the invention by means of a method for the high-pressure treatment of bulk material by extraction and/or impregnation, which bulk material is arranged in the interior volume of a pressure vessel device and is subjected to high-pressure treatment at a high pressure level, in particular at high pressure in the range from 40 to 1000 bar, while sealed off from the surroundings, wherein the high-pressure solvent extraction is performed batchwise in a closed system in the pressure vessel device sealed off in pressure-tight fashion with respect to the surroundings, by virtue of the bulk material being fed batchwise to the interior volume with the pressure vessel device closed and being arranged on or in at least one treatment level and, after the high-pressure treatment has occurred at the high pressure level (or at high pressure), being discharged batchwise from the interior volume with the pressure vessel device closed. According to the invention, the high-pressure treatment is performed using a supporting tray module which is arranged in the interior volume of the pressure vessel device and which has a multiplicity of treatment levels arranged one above the other in the interior volume, wherein the treatment levels are, for the high-pressure treatment and/or for the passage of the bulk material, mounted and positioned in displaceably actuatable fashion in the interior volume. This results in the abovementioned advantages. In particular, effort involved in the case of the opening of a pressure vessel and removal of an insert basket can be eliminated. According to the invention, the feed and discharge of bulk material can occur in the closed system, optionally to/from a multiplicity of treatment levels, optionally also at elevated pressure.

In one embodiment, the batchwise feed of the bulk material occurs by means of an inlet fitting which is actuatable in automated fashion, in particular in partial batches, in particular via a cover of the pressure vessel device. In this way, automation of the overall process can also be facilitated.

In one embodiment, the batchwise discharge of the bulk material occurs by means of an outlet fitting which is actuatable in automated fashion, in particular in partial batches, in particular via a base valve with inwardly opening closing element. This can also facilitate a discharge of the bulk material controlled in closed-loop fashion. Here, the base valve may couple the internal cavity or the interior volume, in particular a conical region, to the surroundings. The base valve may be installed or flange-mounted directly onto a wall of the conical region, wherein a flowing, continuous transition (continuous inner lateral surface) is preferably formed between the conical region and the valve. This facilitates the discharge of bulk material.

According to the invention, the high-pressure treatment is performed on a multiplicity of treatment levels arranged in the interior volume, in particular on at least three treatment levels. This permits, for example, the arrangement in preferred layer thicknesses. It is also possible to avoid flow disadvantages of long fixed beds.

In one embodiment, the batchwise feed of the bulk material comprises a feed of partial batches in each case to one of several treatment levels, in particular in succession firstly to a lowermost treatment level and thereupon in each case to a treatment level arranged further thereabove, in particular in a gravitational force direction in a manner driven by gravitational force. In this way, it is also possible to perform an arrangement of partial batches in the interior volume in the case of a closed system, wherein the partial batches may for example be characterized with regard to the layer thickness or the spatial distribution of the granulate.

In one embodiment, the batchwise discharge of the bulk material comprises a discharge of partial batches in each case from one of several treatment levels, in particular in succession firstly from a lowermost treatment level and thereupon in each case from a treatment level arranged further thereabove, in particular in a gravitational force direction in a manner driven by gravitational force. This facilitates the material flow, and can not least also prevent a build-up of bulk material. For example, the volume of a partial batch is in this case at most as large as the volume of a conical portion of the pressure vessel device.

In one embodiment, during the batchwise feed and/or during the batchwise discharge, at least one of the treatment levels arranged in the interior volume is, for the passage of the bulk material arranged thereon, actuated or displaced, in particular pivoted, in particular by automated actuation, in particular by means of at least one drive unit arranged outside the interior volume at the outside. In this way, the feed and discharge of partial batches can also be performed in a relatively exactly closed-loop-controllable manner, in particular also in a manner driven by gravitational force, optionally exclusively in a manner driven by gravitational force, in a downward direction in partial batches. The arrangement outside the interior volume is not imperatively necessary but may provide advantages with regard to material flow.

In one embodiment, the batchwise feed and the batchwise discharge occur unidirectionally in a single direction through the interior volume, in particular downward in the axial gravitational force direction. This simplifies the material flow, in particular also in high-pressure vessels. Not least, the construction of the device as a whole can remain relatively simple. Optionally, the unidirectional material flow may also occur at least partially in a radial direction, in particular in conjunction with a corresponding embodiment of the treatment levels, and optionally additional fittings.

In one embodiment, the feed and/or discharge occurs pneumatically or with pneumatic assistance. This also permits a robust form of automation and closed-loop control, which is suitable for a wide variety of bulk materials.

In one embodiment, the feed and/or the discharge is performed at a pressure level between ambient pressure and high pressure level, in particular at at least 2 or 3 bar, in particular at over 6 or over 10 bar. This can also save process time and pressure work.

In one embodiment, the high-pressure treatment is performed batchwise in succession for a multiplicity of batches in the closed system in the sealed-off pressure vessel device, in particular over a time period of one to two hours per batch. This also makes it possible to further increase the degree of automation.

In one embodiment, during the feed and/or discharge, the bulk material quantity is detected, in particular by gravimetric means, in particular in relation to individual bulk material partial batches. In this way, it is for example possible for the height of a layer of a respective partial batch on a respective treatment level to be detected or even controlled in closed-loop fashion.

In one embodiment, during the batchwise feed and/or discharge, an activation of inlet and/or outlet fittings occurs, in particular in a manner dependent on gravimetric measured values, detected in real time, of bulk material partial batches. In this way, it is firstly possible for monitoring of the process to occur, and secondly optionally also dosing.

Dosing may be of interest in particular with regard to a maximum loading of a respective treatment level. Between individual treatment levels, there may be formed partial interior volumes in which, for example, the operating state of a fluidized bed can also be implemented, for example with a throughflow in an upward direction. Here, the respective partial interior volume corresponds to an individual treatment compartment. In other words: A fluidization of the bulk material may occur between adjacent treatment levels or plates. In particular, it is possible to react to any flow inhomogeneities by virtue of the loading of a respective treatment level being individually adapted, in particular with regard to the same effectiveness of the treatment from all levels.

In one embodiment, the high-pressure treatment is performed, with the action of heat energy, at an elevated temperature level, in particular in the range from 30 to 100° C. This yields further process variables in the high-pressure treatment. The action of heat energy may be realized by means of at least one heating device coupled to the pressure vessel device. Additionally, it is for example also possible for the throughflow (volume flow) of high-pressure medium to be set.

In one embodiment, during the high-pressure treatment, heat energy is fed to the bulk material by means of high-pressure medium and/or by means of at least one heating device such that an elevated temperature level is attained, in particular in the range from 30 to 100° C., for example 40 to 70° C., for natural substances or 60 to 70° C. for synthetic materials. By means of such setting and closed-loop control of an exact temperature level, the bulk material can be treated in a respectively desired tolerance range.

$CO_2$, for example, is used as high-pressure medium. $CO_2$ has the advantage of a relatively low critical temperature, such that in particular natural substances can be subjected to high-pressure treatment at relatively moderate temperatures by means of $CO_2$.

In one embodiment, the high-pressure treatment comprises at least an extraction, in particular solvent extraction.

Here, the solvent may in particular be discharged by means of the high-pressure medium. The throughflow direction of high-pressure medium may in this case be set substantially freely (axially, radially) depending on the selected process.

In one embodiment, the high-pressure treatment comprises at least an impregnation, in particular the impregnation of polymers, for example as described in the publications EP 0 222 207 A2 and EP 0 683 804 B1. This yields advantages that have already been described above with regard to an extraction. Here, the impregnation medium may in particular be introduced by means of the high-pressure medium. With regard to the type of impregnation media that can be used, reference may for example likewise be made to said publications.

In one embodiment, the high-pressure treatment comprises both an extraction and an impregnation, in particular the extraction of monomers and the impregnation with additives, in particular of polymers. This provides a wide range of application and, not least, permits an efficient method combination. The extraction may be performed prior to the impregnation.

In one embodiment, the high-pressure treatment comprises at least a solvent extraction, and is performed above the critical temperature and above the critical pressure of the solvent. In this way, surface forces can be minimized, and an extraction or drying can be performed in a particularly effective manner.

In one embodiment, bulk material in the form of aerogels is subjected to high-pressure treatment by extraction and/or impregnation. It has been found that the arrangement according to the invention or the method according to the invention is advantageous in particular also for bulk materials in the form of aerogels (or aerogel bodies). In the case of aerogels in particular, an extraction of solvents may be desired/necessary. In the case of aerogels (highly porous solid bodies) in particular, a change in volume, in particular increase in volume, during the high-pressure treatment may be particularly pronounced, for example in the range of a factor of 10, or, in other words, for example in the range of a radius enlargement by a factor of 2-3.

In one embodiment, the high-pressure treatment comprises a fluidization of the bulk material, in particular in a fluidized bed (active generation or closed-loop control of the transition from a fixed bed to a fluidized bed), in particular in an outlet-side region of the pressure vessel device. The fluidized bed is in particular generated exclusively by means of extraction medium. The bulk material is advantageously introduced into a fluidized bed in which only one high-pressure treatment level is provided for the fluidized bed (in particular in an embodiment as a displaceable or pivotable flap level), in particular at a lower end of the pressure vessel device. The fluidized bed may be sealed off on both sides by one of several high-pressure treatment levels. The corresponding treatment level may be sealed off or closed (bulk material is contained) before the removal of the bulk material. Here, the fluidized bed may also be formed on multiple treatment levels, in particular on multiple levels one above the other. The fluidized bed makes it possible to realize advantageous material transport characteristics in combination with the possibility of unrestricted expansion of the treated bulk materials. For example, in the case of polystyrene (PS) granulates, a targeted surface treatment may also occur.

According to the invention, the above-stated object is also achieved by means of a control device configured for carrying out a method as described above, wherein the control device is coupled to at least one sensor unit configured for detecting a throughflow of bulk material or a mass or a mass difference or a volume or a volume difference, optionally also with at least one sensor unit configured for detecting a travel and/or a force, in particular coupled to a respective actuating member of the pressure vessel device. This results in the abovementioned advantages.

The above-stated object is also achieved according to the invention by means of the use of a supporting tray module with a multiplicity of treatment levels for the high-pressure treatment of bulk material, at a high pressure level in the range from 40 to 1000 bar, by extraction and/or impregnation in a closed system which is sealed off in pressure-tight fashion from the surroundings, wherein the supporting tray module is arranged in a suspended manner in an interior volume of a pressure vessel device, in particular by virtue of a cover of the supporting tray module forming the cover of the pressure vessel device, wherein the (respective) treatment levels arranged one above the other are, for the high-pressure treatment and/or for the passage of the bulk material arranged thereon, mounted and positioned in displaceably actuatable fashion in the interior volume, in particular the use of the supporting tray module in a method as described above, in particular the use of the supporting tray module in a pressure vessel device as described above, in particular at high pressure at pressures above 40 to 1000 bar. This results in the abovementioned advantages.

FIG. 1 shows a pressure vessel device 10 with a supporting tray module 20 integrated and fitted therein (illustrated in the installed state) for the accommodation and arrangement of bulk material 1 or granulate, wherein a bed or batch 2 in the form of multiple partial batches 2.1, 2.2, 2.$n$, which are arranged in each case on an individual treatment level 27, is formed in the interior volume Vi (or in the corresponding cavity) bordered by a high-pressure-resistant wall 12 of the pressure vessel device. By way of example, five treatment levels are illustrated. The respective treatment level 27 defines a height position z27 for the arrangement of bulk material 1.

A cover 11, which can be installed with high-pressure-resistant sealing action, of the pressure vessel device 10 is provided by a cover 21 of the supporting tray module 20, or vice versa. By means of the installation of the supporting tray module, the vessel 10 can be closed in high-pressure-tight fashion ("integral construction"). A high-pressure-resistant fastening can be realized by fastening means 11.5, in particular screw connections provided in an encircling manner, and a centering means 11.7. A cylindrical portion 12.1 of the wall 12 has corresponding fastening means.

The cover 11, 21 is denoted here by two reference designations in order to highlight that the cover 21 can be provided as a supporting component of the supporting tray module and can at the same time form the cover 11 of the pressure vessel device 10. It is the intention here for this type of construction to be described by the expression "integral construction".

Fastening means 11.1 for at least one inlet fitting 13 are provided, in particular fixable by means of screw connections, on the cover 11, 21. Furthermore, in the cover 11, 21, there are formed multiple passages 11.2 for bulk material 1, in particular two passages in a symmetrical arrangement in relation to a central longitudinal axis M of the pressure vessel device 10 or of the supporting tray module 20.

On the cover 11, 21, there is optionally furthermore provided at least one leadthrough 11.3 for at least one actuating member (25), wherein a high-pressure-resistant seal 11.4 is provided in the leadthrough 11.3. Via the leadthrough 11.3, a drive unit (22) can be coupled to the respective actuating member. Alternatively, the drive unit may be arranged in the interior volume Vi.

Bulk material 1 is introduced into the interior volume Vi via one or more inlet lines 13.2 by means of inlet members 13.1, in particular valves and/or locks, and, for a high-pressure treatment, is arranged in the form of partial batches 2.1, 2.2, 2.n in a respective treatment level 27 at different height positions. For this purpose, the supporting tray module 20 has a kinematic mechanism which will be described in more detail in conjunction with FIGS. 3 and 5.

The high-pressure treatment comprises in particular extraction and/or impregnation. The high-pressure treatment may be performed under the action of heat. A heating device 14 which is situated around the wall 12 and which is in the form of a heating jacket can feed in the correspondingly desired heat energy, for example in addition to heat energy that is introduced by means of high-pressure medium M2.

Analogously to the material flow into the interior volume in partial batches, a discharge may be performed in partial batches. Below a conical portion 12.2 of the wall 12, there is provided an outlet fitting 15, in particular container base unit, with at least one outlet member 15.1, in particular base valve and/or lock. The outlet fitting 15 may be integrated into the conical portion 12.2 and/or fastened in high-pressure-tight fashion thereto, in particular by means of screw connections. The outlet member 15.1 has an inwardly opening closing element 15.2, in particular in the form of a cone, which can be actuated by means of an actuating member 15.3 (FIG. 4). The granulate 1 can be discharged from the interior volume via an outlet connector 15.4.

For the feed and discharge of high-pressure medium M2, inflow/outflow fittings 16, 17 are provided, in particular in the form of connectors.

The pressure vessel device 10 and the supporting tray module 20 together form, in the installed state, a high-pressure treatment system 30. The respective treatment level 27 may in particular be formed by one or more perforated plates and/or meshes.

The indicated coordinate system characterizes a width direction x, a transverse or depth direction y, and the vertical or gravitational force direction or height direction z.

In the arrangement shown in FIG. 1, the material flow (flowing bulk material) may occur unidirectionally in the gravitational force direction, that is to say logically downward in a manner driven by gravitational force, without diversion or deviation.

FIG. 2 shows the pressure vessel device 10 in an open state, without a supporting tray module 20 and without a batch. The interior volume Vi is not sealed off from the surroundings U. In this state, the supporting tray module 20 can be arranged in the interior volume Vi, in particular by installation of the cover 11, 21 on the wall 12. In particular in the case of very voluminous containers, this type of installation can provide great advantages.

Figure 3:
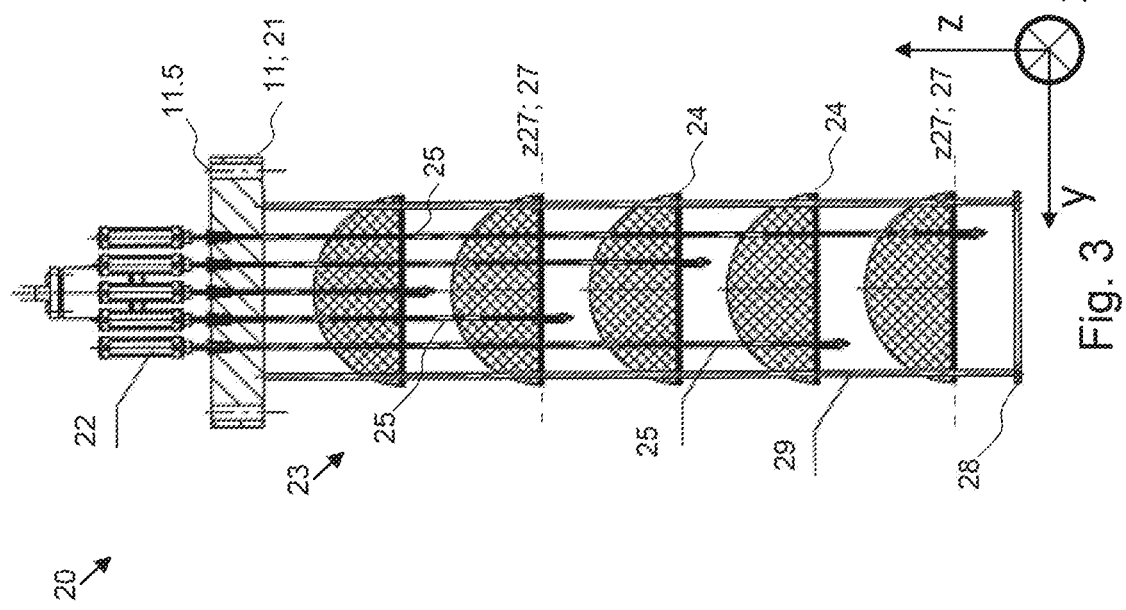
FIG. 3 is a schematic sectional side view of an open pressure vessel device (without supporting tray module) and the supporting tray module according to an exemplary embodiment.
Figure 5:
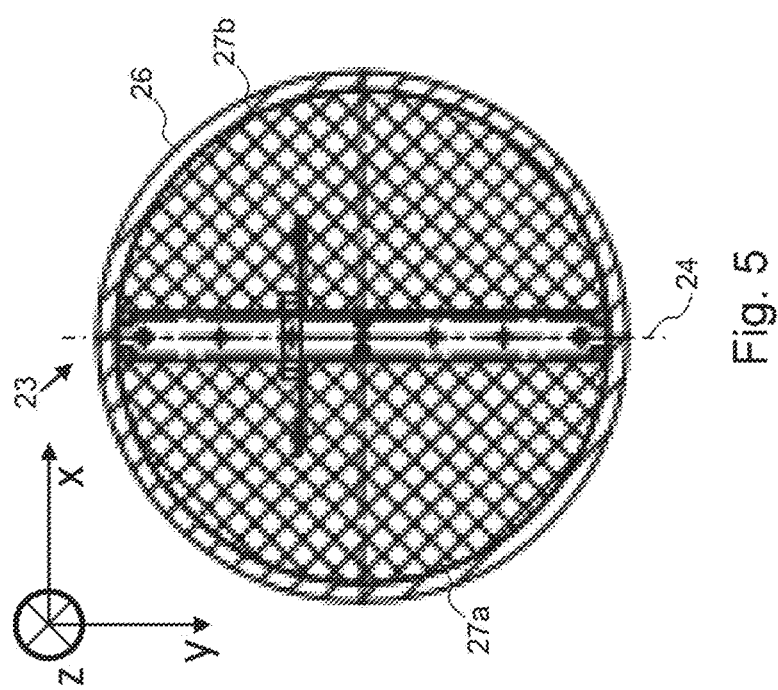
FIG. 5 is a plan view of a bottom side, a treatment level of a supporting tray module of a pressure vessel device according to an exemplary embodiment.

FIGS. 3 and 5 illustrate the supporting tray module 20 in detail. At the outside on the cover 21, there is provided a drive unit 22, in particular with pneumatic cylinder, which is coupled to a kinematic mechanism 23. The kinematic mechanism 23 comprises in particular five actuating members 25, in particular each in the form of a thrust/tension rod, and multiple actuating levers 25.1, which are each mounted at both sides in rotary joints 25.2, 25.3. The kinematic mechanism is thus configured to individually actuate each treatment level. The kinematic mechanism may optionally be configured to actuate all treatment levels simultaneously or in a coupled-together manner.

In FIGS. 3 and 5, a first and a second part 27a, 27b of the respective treatment level 27 are visible, these being in the form of pivotably mounted gas-permeable plates. A transverse web 24 provides, for each treatment level 27, a respective pivot axis for the kinematic mechanism 23. The plates 27a, 27b may in particular be in the form of semi-circular perforated plates. The entire construction may be of symmetrical form in relation to the transverse webs 24. The actuating members 25 are arranged preferably exactly in the plane of symmetry (yz).

Figure 6:
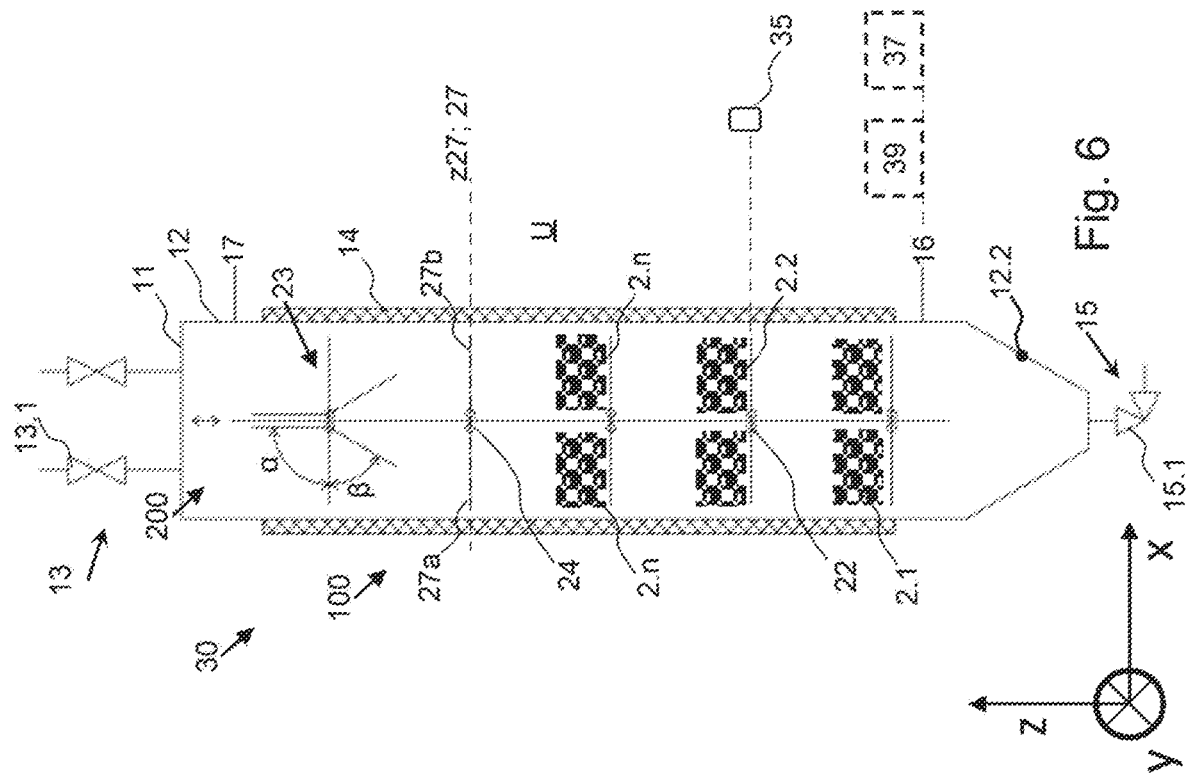
FIG. 6 is a schematic sectional side view of a pressure vessel device according to an exemplary embodiment.

FIGS. 1 and 6 illustrate a first pivot angle α upward counter to the gravitational force direction and a second pivot angle β downward in the gravitational force direction. For the feed of bulk material into the empty interior volume, all treatment levels, aside from the lowermost treatment level, are pivoted into a vertically upward orientation (angle α up to) 90°. The first partial batch can fall onto the lowermost treatment level, in particular until a desired loading (mass) has been attained. The second treatment level from the bottom is thereupon pivoted into the horizontal orientation, and the process of feeding a partial batch is repeated. In this way, it is easily possible for three, five or even a considerably greater number of treatment levels to be loaded. As soon as the uppermost treatment level has been loaded, the high-pressure treatment can occur. The unloading/discharge of bulk material thereupon preferably likewise occurs in partial batches, although it would also be possible for all treatment levels to be displaced downward more or less simultaneously. Firstly, the lowermost treatment level is displaced downward, and the partial batch then slides into the conical region 12.2. The closing element 15.2 can be inwardly opened (or is already open), and the partial batch can be discharged. The next-higher treatment level is thereupon displaced downward. Depending on the type of process, the closing element 15.2 may optionally remain in the open position, or may be closed in the intervening time. In the case of a closing element 15.2 which is closed and imparts a sealing action in the intervening time, the discharge of material can occur in a more controlled manner.

For the purposes of mechanical stability and support, it is possible for at least one geometrically coupling intermediate element 26 (only in FIG. 5), in particular a centering ring, and multiple holding units 29, in particular holding rod(s), to be provided. The intermediate element 26 can promote the material flow, for example with regard to an arrangement of granulates in the wall region. It is optionally possible for a support unit 28, in particular in the form of a (centering) ring, to be provided, for the purposes of radial support, in the lower region of the module 20. Axial support is not imperatively necessary, in particular because the entire module 20 can be arranged in a suspended manner in the interior volume Vi, supported on the cover 11 or on the upper end of the wall 12.

FIG. 4 furthermore shows a control device 31, a logic unit 33 and multiple sensor units 35 arranged at different measurement points in the system 30, in particular for temperature, pressure, force, travel, mass and/or throughflow. The feed, high-pressure treatment and discharge may, by means of the control device 31, occur in an at least partially automated manner, preferably in a fully automated manner.

The position of individual sensor units can be freely selected. In particular, it is possible for multiple pressure sensors to be provided which are arranged such that a pressure loss across the partial batches can be detected. During the impregnation and/or extracting, a pressure difference that takes effect can be a process variable by means of which the process can be controlled in open-loop or closed-loop fashion, and/or monitored, in a simple manner. The pressure loss is indeed also dependent on the type of granulate, and must be individually monitored. The pressure difference that takes effect may also be detected in relation to inlet and outlet fittings. Optionally, a safety system in the form of a bypass may be provided in order to avoid excessively high pressure differences.

It is also preferable for a multiplicity of mass sensors to be provided, in particular in each case at least one mass sensor per treatment level. This facilitates the detection of partial batches and the closed-loop control of the feed and of the discharge of bulk material.

Furthermore, three media flows are indicated in FIG. 4: the first media flow M1 denotes the bulk material flow, the second media flow M2 denotes high-pressure medium or extraction medium, optionally comprising impregnation medium, and the third media flow M3 denotes solvent, which can be discharged separately or together with the high-pressure medium M2.

FIG. 6 shows a further exemplary embodiment of a pressure vessel device 100 and of a supporting tray module 200, wherein the features described above may be partially or entirely likewise realized in this exemplary embodiment. The drive unit 22 may optionally be arranged at the outside on the wall 12 or on the cover 11, and/or in the interior volume Vi, in particular in the form of at least one rotary drive on a pivot axis of the supporting tray module. For the impregnation, a buffer vessel 37 may be provided in combination with a dosing means 39.

Individual aspects of advantageous variants or exemplary embodiments will be discussed in the following figures. The respective variants or exemplary embodiments are combinable with one another unless explicitly stated otherwise.

FIGS. 7A, 7B, 7C and 7D show three exemplary embodiments, in the case of which the supporting tray module 300 defines multiple treatment levels, which are each formed by an integral plate. The kinematic mechanism for the displacement of the plates is formed in particular by a respective thrust rod (FIG. 7B shows an eccentric arrangement of the thrust rod (lever linkage), with only one centrally arranged inlet fitting) and/or by a rotary drive (FIG. 7C). Here, the drive variants may be provided by the combinations already described above. These exemplary embodiments provide advantages in particular with regard to robustness and simple construction. The plates pivot downward at one side. The feed of the respective (partial) batch can occur centrally via the cover. The discharge can occur centrally via an outlet fitting at the base. The central discharge at the base provides, for example, process-related advantages, in particular in the case of a discharge driven by gravitational force, in particular with regard to a complete discharge without residues.

FIGS. 8A, 8B, 8C and 8D show three exemplary embodiments, in which the supporting tray module 400 is characterized by an eccentric arrangement of the actuating members. For each treatment level, a plate is provided which is eccentrically mounted and which is pivotable upward and downward. Edge regions of a respective treatment level can be utilized for supporting structures.

FIGS. 9A, 9B and 9C show two exemplary embodiments, in the case of which the supporting tray module 500, in particular in an embodiment as per FIGS. 7 and 8, is arranged in a pressure vessel device 10; 100; 110, wherein individual treatment levels of the supporting tray module are laterally actuatable. Leadthroughs for lateral actuating means 25a are provided in the wall of the pressure vessel device, in each case specifically for each treatment level. The actuatable lateral actuating means 25a make possible a kinematic mechanism at least comprising a pivot mechanism, in particular in an embodiment as thrust rods. The actuating means 25a may be coupled directly to the respective plate or indirectly by means of a kinematic coupling means to the respective treatment level. FIGS. 9A and 9B show the principle of the lateral actuation in the case of a central or eccentric mounting of plates, wherein, optionally, one or more plates which are pivotable downward at one side, or are pivotable upward and downward at both sides, are provided for each treatment level. In addition or alternatively to the inlet for bulk material at the cover, it is also possible for an inlet fitting and/or outlet fitting to be provided in each case laterally at the height of the respective treatment level.

FIGS. 10A and 10B show two exemplary embodiments in which the supporting tray module 600 has a centrally arranged lever linkage, by means of which the individual plates are pivotable by translation. Two plates may be provided, in particular in a symmetrical arrangement, for each treatment level. The pivoting occurs without an actuating lever (FIG. 10A) or by means of a kinematic mechanism comprising in each case one actuating lever per plate half (FIG. 10B).

FIGS. 11A and 11B show an exemplary embodiment in which the pressure vessel device 110 has fixed trays for each treatment level, optionally in a horizontal orientation (FIG. 11A) or in an oblique orientation (FIG. 11B). Exclusively inlet and outlet fittings which are arranged laterally at the height of the respective treatment level are provided. Optionally, a bulk material suction extraction means is provided. In this pressure vessel device 110, the method according to the invention can be performed in a closed system for a respective partial batch. The treatment levels can be individually loaded independently of one another. This exemplary embodiment for example also provides advantages in the case of the simultaneous high-pressure treatment of different bulk materials on different levels.

FIG. 12 shows an exemplary embodiment in which the supporting tray module 700 has a kinematic pivot mechanism and is arranged in a pressure vessel device 110 with lateral inlet fittings. The discharge of bulk material may occur centrally at the outlet fitting at the base. In this exemplary embodiment, the kinematic mechanism can be optimized for the pivoting and discharge in a downward direction.

FIGS. 13A and 13B show an exemplary embodiment in which the supporting tray module 800 has a kinematic mechanism with rotary mechanism with an at least approximately vertically oriented axis of rotation. At each treatment level, two plates mounted one above the other are rotated relative to one another. FIG. 13B shows the respective treatment level in an opened state, wherein, by way of example, four passages are illustrated.

FIGS. 14A, 14B and 14C show an exemplary embodiment in which the supporting tray module 900 has a kinematic mechanism with translational mechanism with an at least approximately horizontally oriented displacement axis. At each treatment level, two plates mounted one above the other are displaced translationally relative to one another. FIG. 14C shows the respective treatment level in an opened state. The translational kinematic mechanism may in this case be realized for example by lateral actuating means, or on the basis of a further one of the mechanisms described here. It is optionally also possible for an additional rotary drive to be provided which is coupled to a central rotary shaft and which actuates in each case at least one of the plates at each treatment level.

FIGS. 15A, 15B, 15C, 15D, 15E and 15F show three exemplary embodiments in which the supporting tray module 990 has in each case a kinematic mechanism which opens from the inside outward and which has a flap structure, wherein, in the respective treatment level, there are optionally also provided run-off inclines, and/or edge regions for bearing structures. At each treatment level, there are provided at least two plates which are arranged symmetrically with respect to a central longitudinal axis and transverse web, and which are in each case downwardly and upwardly pivotable. The respective plate is mounted eccentrically about a pivot axis, and an opening occurs proceeding from the center (pivoting downward or else upward). The kinematic mechanism may in particular also comprise coupling joints and/or traction mechanisms and/or at least one spring mechanism with resetting movement.

Figure 16:
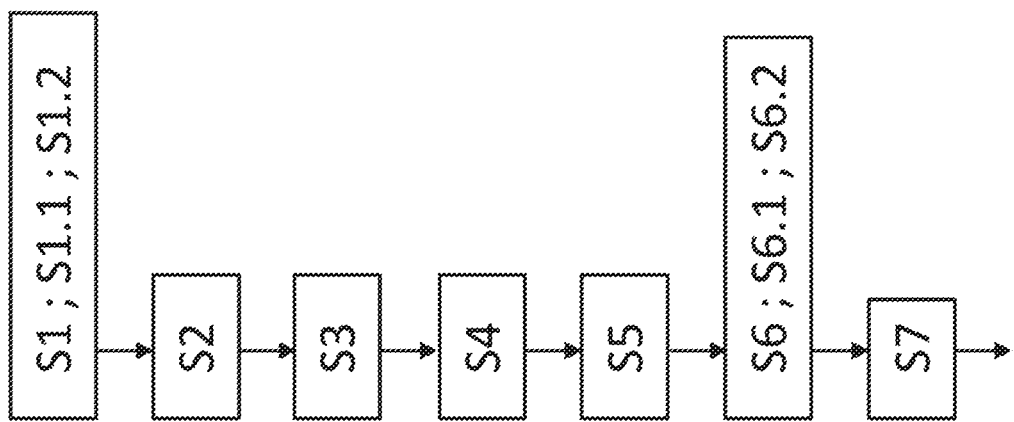
FIG. 16 is a schematic view of the method steps of a method for high-pressure treatment according to an embodiment.

FIG. 16 shows individual method steps of a method for high-pressure treatment. A first step S1 comprises a feed of bulk material, wherein an actuation S1.1 of at least one treatment level occurs. Preferably, the treatment levels are actuated proceeding from a lowermost treatment level. The respective treatment level is moved into an accommodation/treatment position, in particular is pivoted into the horizontal plane. A feed S1.2 of a (partial) batch thereupon occurs. The treatment level situated thereabove can subsequently be actuated.

In a second step S2, a pressure build-up to the desired high pressure level occurs, optionally proceeding from ambient pressure or from an intermediate pressure level elevated in relation thereto.

An extraction occurs in a third step S3, and/or an impregnation occurs in a fourth step S4, this sequence being variable. Here, closed-loop pressure and temperature control may occur in each case, which is illustrated by way of example in FIG. 4 by means of the sensor unit 35. One or more such sensor units may also be provided in the further steps for closed-loop control, in particular on the basis of temperature, pressure, force, travel, mass and/or through flow measurement values.

In a fifth step S5, a pressure dissipation occurs, optionally to ambient pressure or to an intermediate pressure level elevated in relation thereto.

In a sixth step S6, a discharge of bulk material occurs, wherein an actuation S6.1 of at least one treatment level occurs. Preferably, the treatment levels are actuated proceeding from a lowermost treatment level. The respective treatment level is moved into a passage position, in particular is pivoted at least approximately into the vertical plane, or at an angle of for example 10-20° in relation thereto. A discharge S6.2 of a (partial) batch thereupon occurs. The treatment level situated thereabove can subsequently be actuated. The discharge of a respective partial batch can permit good monitoring/closed-loop control of the material flow.

In a seventh step S7, for preparation for a subsequent high-pressure treatment, high-pressure-tight sealing-off of the interior volume thereupon occurs at the outlet fitting of the pressure vessel, in particular by means of an inwardly opening valve.

The present invention is in particular also distinguished by the possibility of the automated open-loop and closed-loop control of processes which hitherto have rather been characterized by manual activities. Not only is working safety increased, but an automation of material flow or high-pressure treatment is also possible in a simple manner, such that a highly efficient process can be realized for a multiplicity of applications, in particular also substantially independently of the hazard category of extracted solvents or of the selected impregnation medium, in particular also substantially independently of the type of granulate to be treated.

Figure 17B:
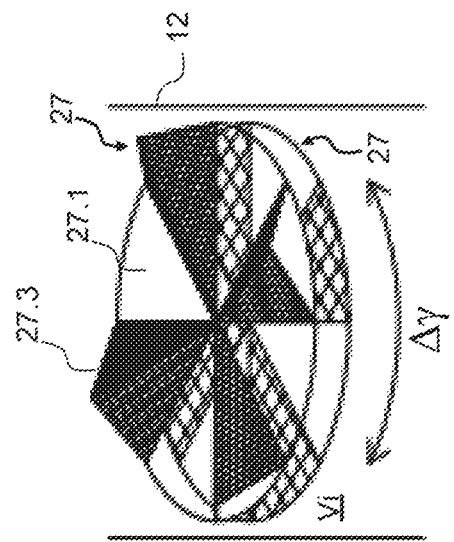
FIG. 17B, is a schematic perspective sectional side view of one further exemplary embodiment of a pressure vessel device.
Figure 17C:
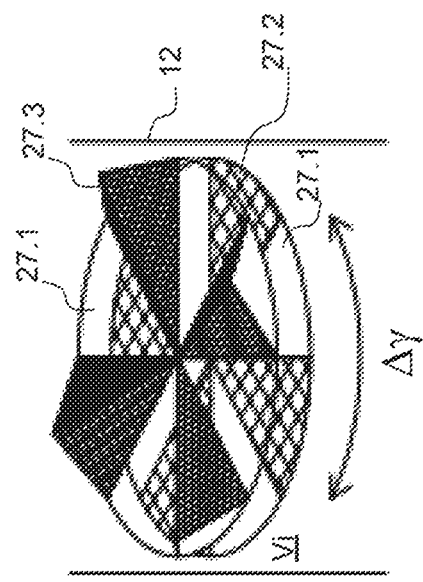
FIG. 17C is a schematic perspective sectional side view of one further exemplary embodiment of a pressure vessel device.
Figure 17A:
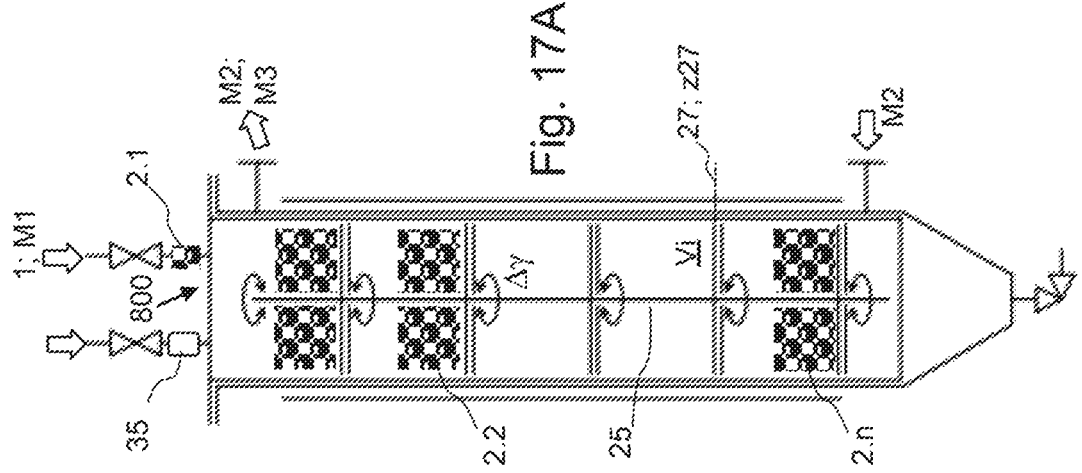
FIG. 17A is a schematic perspective sectional side view of one further exemplary embodiment of a pressure vessel device.

FIGS. 17A, 17B and 17C show, in detail, a variant in which a rotational actuating member 25 (in particular rod) is coupled to a multiplicity of treatment levels 27 or plates, wherein each treatment level is defined by a pair of plates 27, of which one is arranged in a positionally fixed and static manner and the other is rotationally displaceable and is connected rotationally conjointly to the actuating member 25. A respective partial batch 2.1, 2.2, 2.n can be displaced between the individual treatment levels, in particular in a manner driven by gravitational force, in reaction to a relative rotation of the two plates of a respective treatment level with respect to one another.

The rotation actuating movement may in this case be at least approximately a continuous movement, or the rotation actuating movement may optionally also occur in discontinuous fashion between at least two actuation positions (in particular open position and closed position).

In particular, FIG. 17A shows, in detail, the use and arrangement of individual treatment levels in the positionally fixed volume Vi, wherein at least one rotational actuating member 25 is provided.

On the basis of the example of FIG. 17A, it is also possible to explain the material flow: Bulk material 1 is fed as an individual partial batch 2.1. In the high-pressure treatment volume, multiple bulk material partial batches 2.1, 2.2, 2.n result in the entire bulk material batch under high-pressure treatment. The bulk material flow propagates for example through multiple discharged partial batches. Here, at least one sensor unit 35 may be provided, in particular for temperature, pressure, force, travel, mass and/or throughflow.

FIGS. 17B and 17C illustrate the way in which the respective treatment level can be set in a sealing-off state or in a passage-permitting state. FIG. 17B illustrates a passage-permitting state in which a respective passage segment 27.1 of the upper plate, which is connected rotationally conjointly to the actuating member, is arranged in a rotational position in alignment with a respective passage segment 27.1 of the lower, positionally fixedly arranged plate. Here, furthermore, a respective inclined, in particular conical (in particular gable-roof-shaped) segment 27.3 of the upper plate is arranged in alignment with a respective planar segment 27.2 of the lower plate. The respective pairwise plate arrangement 27 provides a passage. The inclined surfaces can perform a function as run-off inclines for the bulk material, and also reduce a risk with regard to undesired local bulk material deposits.

FIG. 17C illustrates a sealed-off state, in which, in reaction to a rotational actuating movement Δγ (rotational angle change), a respective inclined, in particular conical, segment 27.3 of the upper plate is arranged in alignment with a respective passage segment 27.1 of the lower plate. The respective pairwise plate arrangement 27 imparts a blocking action.

The individual plates 27 are in particular each designed as a circular disk with the cutouts (passage openings) already described. It is optionally possible for the levels z27 to be actuated individually separately or simultaneously together of the rotation actuating movement. The passage openings 27.1 may be arranged in an aligned or offset manner.

The plate pair 27 shown in FIG. 17B may also, in other exemplary embodiments, be designed as a pair of two planar plates with in each case at least one passage 27.1.

The respective actuating movement in the exemplary embodiment shown in FIGS. 17A, 17B and 17C can ensure a material flow of a multiplicity of partial batches 2.1, 2.n over a section along the material flow path through the high-pressure treatment volume Vi. Here, the rotational actuating movement may be a continuous and/or an at least intermittently cyclic actuating movement. The (respective) rotation actuating movement may in this case be predefined uniformly for the entire high-pressure treatment volume for all high-pressure treatment levels, and/or may at least intermittently be predefined in each case specifically for individual predefinable high-pressure treatment levels z27.

In FIG. 18, by way of example, a relative orientation of passage segments 27.1 with respect to adjacent passage segments 27.1 in the respectively subsequent treatment level will be discussed. The passage segments 27.1 are in each case arranged so as to be offset with respect to one another by a rotational angle.

FIG. 19 schematic shows a variant with translationally actuatable actuating members 25. It is optionally also possible for rotary kinematic mechanisms to be integrated into the interior volume Vi.

FIGS. 20A and 20B show a pressure vessel device 10 with a combined supporting tray module which is formed from a first portion 200 with a kinematic pivot mechanism 23 and of a second portion 800 with a rotational kinematic mechanism, wherein the kinematic pivot mechanism 23 is arranged upstream of and in series with the rotational kinematic mechanism. This embodiment may be advantageous in particular in the case of a significant increase in volume of the bulk material during the high-pressure treatment, in particular if a subsequent extraction occurs with a substantially constant volume. The kinematic pivot mechanism with relatively small heights between the levels permits gentle treatment of the bulk material, and the downstream rotational kinematic mechanism in particular also promotes efficient utilization of the available interior volume.

Figure 21B:
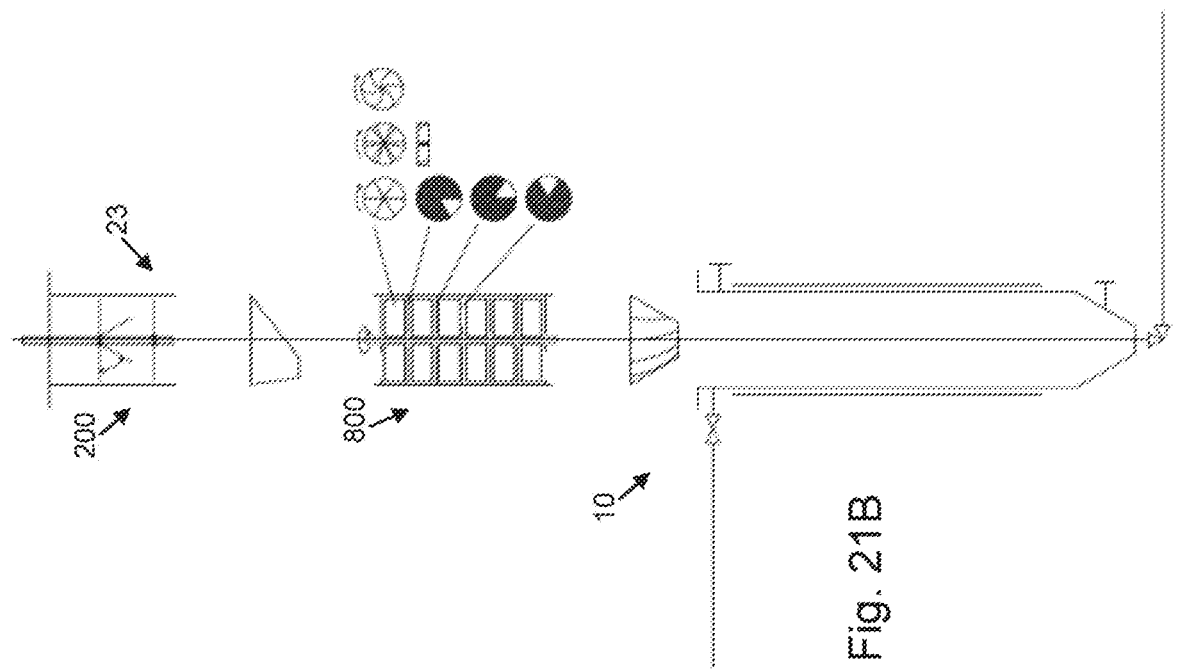
FIG. 21B is an exploded schematic sectional side view of a further exemplary embodiment of a pressure vessel device with a combined supporting tray module for both translational and rotational actuating movements.
Figure 21A:
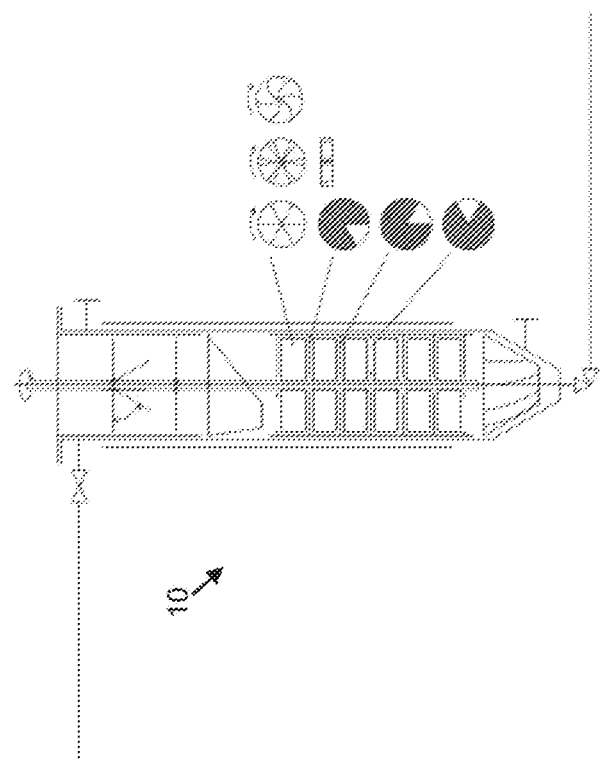
FIG. 21A is an exploded schematic sectional side view of a further exemplary embodiment of a pressure vessel device with a combined supporting tray module for both translational and rotational actuating movements.

FIGS. 21A and 21B show a pressure vessel device 10 with a combined supporting tray module, or a combination of at least two supporting tray modules, which is formed from a first portion 200 with a kinematic pivot mechanism 23 and of a second portion 800 with a rotational kinematic mechanism, wherein the kinematic pivot mechanism 23 is arranged upstream of and in series with the rotational kinematic mechanism. Downstream of the respective module 200, 800, there may be provided a unit (in particular funnel with bulk-material-directing function) for directing the material flow, in particular with a funnel-shaped geometry. These units (preferably rigid fixtures) can direct the material flow in targeted fashion onto the subsequent module or to the outlet, in particular for the purposes of a spiral-shaped inflow into the outlet.

Figure 22B:
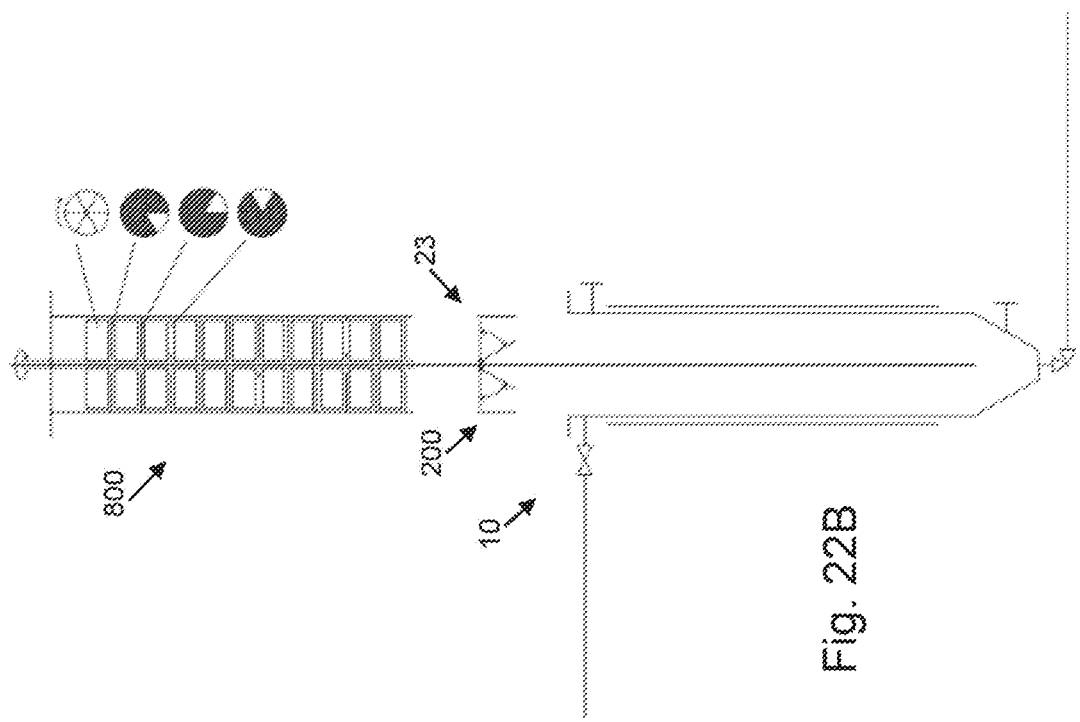
FIG. 22B is an exploded schematic sectional side view of a further exemplary embodiment of a pressure vessel device with a combined supporting tray module for both translational and rotational actuating movements.
Figure 22A:
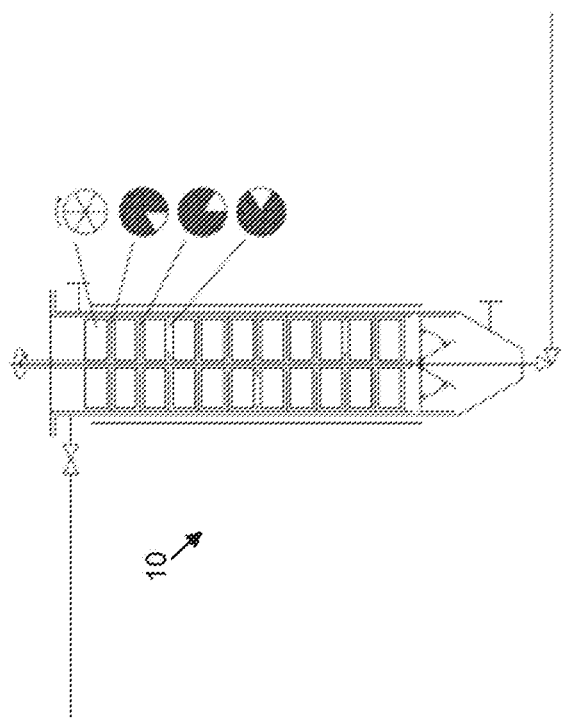
FIG. 22A is an exploded schematic sectional side view of a further exemplary embodiment of a pressure vessel device with a combined supporting tray module for both translational and rotational actuating movements.

FIGS. 22A and 22B show a pressure vessel device 10 with a combined supporting tray module which is formed from a first portion 800 with a rotational kinematic mechanism and of a second portion 200 with a kinematic pivot mechanism 23, wherein the kinematic pivot mechanism 23 is arranged downstream of and in series with the rotational kinematic mechanism. In this arrangement, the discharge of bulk material can be facilitated, in particular with regard to the size of partial batches, by means of the kinematic pivot mechanism 23.

LIST OF REFERENCE SIGNS

1 Bulk material or granulate (bed)
2 Batch
2.1, 2.2, 2.n Partial batch
10; 100; 110 Pressure vessel device
11 Cover
11.1 Fastening means or flange for inlet fitting
11.2 Passage for bulk material
11.3 Leadthrough for actuating member
11.4 Seal on actuating member
11.5 Fastening means
11.7 Centering means
12 High-pressure-resistant wall
12.1 Cylindrical portion
12.2 Conical portion
13 Inlet fitting, in particular of two-channel configuration
13.1 Inlet member, in particular valve and/or lock
13.2 Inlet line
14 Heating device, in particular heating jacket
15 Outlet fitting, in particular vessel base unit
15.1 Outlet member, in particular base valve and/or lock
15.2 Inwardly opening closing element, in particular cone
15.3 Actuating member
15.4 Outlet connector
16 Inflow/outflow fitting, in particular connector
17 Inflow/outflow fitting, in particular connector
20; 200; 300; 400; 500; 600; 700; 800; 900; 990 Supporting tray module
21 Cover
22 Drive unit, in particular with pneumatic cylinder
23 Kinematic mechanism, in particular kinematic pivot mechanism
24 Transverse web
25 Actuating member, in particular thrust/tension rod
25a Lateral actuating means
25.1 Actuating lever
25.2 Rotary joint
25.3 Further rotary joint
26 Intermediate element (with geometrical coupling action)
27 Treatment level, in particular with perforated plate or mesh
27a, 27b First and second part of the treatment level, in particular in pivotable bearing arrangement
27.1 Passage segment
27.2 Planar segment
27.3 Inclined, in particular conical or gable-roof-shaped segment
28 Support unit, in particular (centering) ring
29 Holding unit, in particular holding rod(s)
30 High-pressure treatment system
31 Control device
33 logic unit
35 Sensor unit, in particular for temperature, pressure, force, travel, mass and/or throughflow
37 Storage container, reservoir
39 Dosing means
M1 First media flow: bulk material
M2 Second media flow: high-pressure medium or extraction medium, optionally comprising impregnation medium
M3 Third media flow: solvent
M Central longitudinal axis
U Surroundings
Vi Interior volume, or cavity enclosed by the pressure vessel
S1 First step, in particular feed of bulk material
S1.1 Actuation of at least one treatment level
S1.2 Feed of a partial batch
S2 Second step, in particular pressure build-up
S3 Third step, in particular extraction
S4 Fourth step, in particular impregnation S5 Fifth step, in particular pressure dissipation
S6 Sixth step, in particular discharge of bulk material
S6.1 Actuation of at least one treatment level
S6.2 Discharge of a partial batch
S7 Seventh step, in particular high-pressure-tight sealing-off of the interior volume at the outlet fitting
z27 Treatment level or height position of the treatment level
x Width direction or pivot axis
Y Transverse or depth direction, pivot axis
z Vertical or gravitational force direction or height direction
α First pivot angle, in particular upward counter to the gravitational force direction
β Second pivot angle, in particular downward in the gravitational force direction
γ Angle of rotation of a rotational actuating movement

What is claimed is:

1. A method for a high-pressure treatment of bulk material, comprising:
    arranging the bulk material in an interior volume of a pressure vessel device, wherein the bulk material comprises an aerogel;
    sealing the pressure vessel;
    applying a high pressure level in a range from 40 to 1000 bar to the bulk material;
    performing, batchwise, the high-pressure treatment by at least one of extraction or impregnation in a closed system in the pressure vessel device using a supporting tray module that is arranged in the interior volume and has a multiplicity of treatment levels arranged one above the other in the interior volume, wherein the high-pressure treatment comprises feeding the bulk material batchwise to the interior volume with the pressure vessel device closed and arranging the bulk material on at least one treatment level of the multiplicity of treatment levels, wherein for the high-pressure treatment and/or for passage of the bulk material the multiplicity of treatment levels are mounted and positioned in displaceably actuatable fashion in the interior volume; and
    discharging, batchwise, the bulk material from the at least one treatment level, after the high-pressure treatment has occurred, from the interior volume with the pressure vessel device closed.

2. The method of claim 1 wherein feeding the bulk material batchwise comprises feeding partial batches to the multiplicity of treatment levels.

3. The method of claim 1 wherein, while feeding the bulk material batchwise and/or discharging the bulk material batchwise, the method comprises at least one of:
    the at least one treatment level on which the bulk material is arranged in the interior volume is displaced and the bulk material passes downwards from the at least one treatment level; or
    feeding the bulk material batchwise and/or discharging the bulk material batchwise occur unidirectionally in a single axial direction through the interior volume, wherein the multiplicity of treatment levels are arranged one above the other in the single axial direction.

4. The method of claim 3 wherein discharging the bulk material batchwise occurs downward in an axial gravitational force direction.

5. The method of claim 1 wherein at least one of feeding the bulk material batchwise or discharging the bulk material batchwise is performed at a pressure level in the pressure vessel device between ambient pressure and the high pressure level, wherein the high pressure level is between 40 and 1000 bar.

6. The method of claim 1 wherein, while feeding the bulk material batchwise and/or discharging the bulk material batchwise, the method comprises detecting a bulk material quantity.

7. The method of claim 1 wherein the high-pressure treatment comprises impregnation.

8. The method of claim 1 wherein the high-pressure treatment further comprises a fluidization of the bulk material.

9. A control device configured to carry out the method of claim 1, wherein the control device is coupled to at least one sensor unit configured for detecting in the pressure vessel device a throughflow of the bulk material, a mass of the bulk material, a mass difference of the bulk material, a volume of the bulk material, or a volume difference of the bulk material.

10. A pressure vessel device configured for the high-pressure treatment, at a high pressure level in a range from 40 to 1000 bar, of bulk material by extraction and/or impregnation, comprising:
    a cover;
    a high-pressure-resistant wall that encloses an interior volume;
    an inlet fitting coupled to the interior volume; and
    an outlet fitting, the inlet fitting and the outlet fitting respectively configured to permit passage of the bulk material;
    a supporting tray module arranged in a suspended manner in the interior volume, the module having a multiplicity of actuatable treatment levels mounted and positioned in displaceably actuatable fashion, said treatment levels arranged one above the other, and which are configured in a substantially horizontally oriented plane in the interior volume and are configured to be loaded with bulk material in partial batches when the pressure vessel device is closed, and, after the high-pressure treatment has occurred at the high pressure level, unloadable in partial batches with the pressure vessel device closed, such that the high-pressure treatment is performed in a closed system which is sealed off with respect to an ambient surrounding outside the closed system, wherein the supporting tray module has at least one centering ring and multiple holding units for mechanical stability and support and a support unit for radial support in a lower region of the supporting tray,
    wherein at least one of the treatment levels is defined by at least one gas-permeable plate and/or wherein each respective of the treatment levels is defined by at least one pivotably actuatable gas-permeable plate.

11. The pressure vessel device of claim 10 wherein the inlet fitting is configured to actuate without operator intervention for feeding the bulk material batchwise.

12. The pressure vessel device of claim 10 wherein at least one of:
    one or more of the treatment levels is configured for passage of bulk material; or
    at least one partial region of each treatment level is configured to move from a corresponding high-pressure treatment position into at least one loading/unloading position.

13. The pressure vessel device of claim 10 wherein each of the treatment levels is actuatable between at least two positions comprising a first position for passage of bulk material and a second position for holding bulk material during the high-pressure treatment.

14. The pressure vessel device of claim 10 wherein the supporting tray module is integrated into the cover or is supported in the interior volume by means of the cover and/or wherein the inlet fitting for bulk material is integrated into the cover.

15. The pressure vessel device of claim 10 wherein the multiplicity of actuatable treatment levels includes at least three treatment levels.

16. The pressure vessel device of claim 10 comprising at least one rotationally actuatable actuating member, wherein each treatment level of the multiplicity of actuatable treatment levels is displaceable by the at least one rotationally actuatable actuating member.

17. The pressure vessel device of claim 10 comprising at least one translationally actuatable actuating member, wherein each treatment level of the multiplicity of actuatable treatment levels is displaceable by the at least one translationally actuatable actuating member.

18. The pressure vessel device of claim 10 wherein the supporting tray module comprises both at least one translationally actuatable actuating member and at least one rotationally actuatable actuating member.

* * * * *